(12) United States Patent
Becker et al.

(10) Patent No.: US 12,527,627 B2
(45) Date of Patent: Jan. 20, 2026

(54) GENERATIVE COMPUTATIONAL PREDICTIVE MODEL FOR SOFT TISSUE REPAIR PLANNING

(71) Applicant: DasiSimulations, LLC, Dublin, OH (US)

(72) Inventors: Taylor Nicole Becker, Rancho Palos Verdes, CA (US); Lakshmi Prasad Dasi, Dublin, OH (US); Shelley Chee-Mei Gooden, Beavercreek, OH (US)

(73) Assignee: DasiSimulations, LLC, Dublin, OH (US)

( * ) Notice: Subject to any disclaimer, the term of this patent is extended or adjusted under 35 U.S.C. 154(b) by 0 days.

(21) Appl. No.: 18/429,345

(22) Filed: Jan. 31, 2024

(65) Prior Publication Data

US 2024/0252249 A1 Aug. 1, 2024

Related U.S. Application Data

(60) Provisional application No. 63/482,405, filed on Jan. 31, 2023.

(51) Int. Cl.
*A61B 34/10* (2016.01)
*A61F 2/24* (2006.01)
*G16H 20/40* (2018.01)

(52) U.S. Cl.
CPC ............ *A61B 34/10* (2016.02); *A61F 2/2442* (2013.01); *G16H 20/40* (2018.01); *A61B 2034/104* (2016.02); *A61B 2034/105* (2016.02)

(58) Field of Classification Search
CPC .............. A61B 34/10; A61B 2034/104; A61B 2034/105; G16H 20/40; A61F 2/2442
See application file for complete search history.

(56) References Cited

U.S. PATENT DOCUMENTS

| | | | |
|---|---|---|---|
| 2010/0240996 A1 | 9/2010 | Ionasec et al. | |
| 2019/0095589 A1* | 3/2019 | Kim | G16H 10/60 |
| 2020/0364936 A1* | 11/2020 | Mortier | A61B 34/10 |
| 2022/0296305 A1 | 9/2022 | Dasi et al. | |
| 2022/0392642 A1 | 12/2022 | Dasi et al. | |

OTHER PUBLICATIONS

Morgan et al. "Finite Element Modeling of Mitral Valve Repair." Journal of Biomedical Engineering, vol. 138, pp. 021009-1 to 021009-8. (Year: 2016).*
Wang et al. "3D Printing, Computational Modeling, and Artificial Intelligence for Structural Heart Disease." JACC: Cardiovascular Imaging, vol. 14, No. 1, pp. 41-60. (Year: 2021).*
Carnahan et al. "Interactive-Automatic Segmentation and Modelling of the Mitral Valve." Springer Nature Switzerland AG, Y. Coudiere et al. (Eds.): FIMH, LNCS 11504, pp. 397-404. (Year: 2019).*
Tobis, JM, Percutaneous Mitral Valve Repair Devices Beyond MitraClip. Cardiac Interventions Today, 2015: p. 28-32.
Regueiro, Ander, et al., Transcatheter mitral valve replacement: insights from early clinical experience and future challenges. Journal of the American College of Cardiology, 2017. 69(17): p. 2175-2192.
Benjamin, Emelia J, et al., Heart disease and stroke statistics—2018 update: a report from the American Heart Association. Circulation, 2018. 137(12): p. e67-e492.
Neale, Todd. Surgery After Failed Mitral Edge-to-Edge Repair Tends to Be Replacement. 2021 [cited May 6, 2021]; Available from: https://www.tctmd.com/news/surgery-afterfailed-mitral-edge-edge-repair-tends-be-replacement.
Young, Michael N, et al., Trends in transcatheter vs surgical mitral valve repair among Medicare beneficiaries, 2012 to 2019. JAMA Cardiology, 2022. 7(7): p. 770-772.
Itabashi, Yuji, et al., Different indicators for postprocedural mitral stenosis caused by single-or multiple-clip implantation after percutaneous mitral valve repair. Journal of cardiology, 2018. 71(4): p. 336-345.
Nishimura, Rick A., et al., 2014 AHA/ACC Guideline for the Management of Patients With Valvular Heart Disease. A Report of the American College of Cardiology/American Heart Association Task Force on Practice Guidelines, 2014. 63(22): p. e57-e185.
Caballero, Andrés, et al., A comprehensive engineering analysis of left heart dynamics after MitraClip in a functional mitral regurgitation patient. Frontiers in Physiology, 2020. 11: p. 432.
Simonian, Natalie T, et al., Quantitative in vivo assessment of human mitral valve coaptation area after undersized ring annuloplasty repair for ischemic mitral regurgitation. JTCVS techniques, 2022. 16: p. 49-59.
Simonian, Natalie T, et al., Alterations in the Human Mitral Valve in-vivo Functional State in Mitraclip Repair. Circulation, 2022. 146(Suppl_1): p. A15237-A15237.
Errthum, Ryan, et al., Comparative computational analysis of PASCAL and MitraClip implantation in a patient-specific functional mitral regurgitation model. Computers in Biology and Medicine, 2021. 136: p. 104767.
Kamakoti, Ramji, et al., Numerical simulations of MitraClip placement: clinical implications. Scientific reports, 2019. 9 (1): p. 1-7.
Kong, Fanwei, et al., Finite element analysis of MitraClip procedure on a patient-specific model with functional mitral regurgitation. Journal of biomechanics, 2020. 104: p. 109730.

(Continued)

*Primary Examiner* — Kaitlyn L Minchella
*Assistant Examiner* — Steven W. Bailey
(74) *Attorney, Agent, or Firm* — Benesch Friedlander Coplan & Aronoff LLP

(57) ABSTRACT

In certain aspects of the present disclosure, a computer-implemented method includes receiving a 3D imaging of a heart valve in a pre-operative state. The method includes generating a segmented heart valve by segmenting the heart valve of the 3D imaging. The method includes simulating a surgical procedure on the parameterized heart valve. The method includes determining at least one post-operative outcome based on simulating the surgical procedure on the parameterized heart valve. Systems and machine-readable media are also provided.

14 Claims, 27 Drawing Sheets

(56) References Cited

OTHER PUBLICATIONS

Falk, Volkmar, Neochordal Reconstruction: Pearls and Pitfalls, in American Association for Thoracic Surgeons. 2022: Boston, MA.
Johnson, Eric. STL File Reader. 2022; Available from: https://www.mathworks.com/matlabcentralfileexchange/22409-stl-file-reader.
SVEN. stlwrte—write ASCII or Binary STL files. 2022; Available from: https://www.mathworks.com/matlabcentral/fileexchange/20922-stlwrite-write-ascii-orbinary-stl-files?s_tid=FX_rc1_behav.
International Search Report and Written Opinion issued in International Application No. PCT/US24/13870, mailing date Jun. 27, 2024.

* cited by examiner

Baseline

Plication

Leaflet Graft

Aortic Root Graft

GENERATIVE COMPUTATIONAL PREDICTIVE MODEL FOR SOFT TISSUE REPAIR PLANNING

CROSS-REFERENCE TO RELATED APPLICATIONS

The present application claims the benefit of priority under 35 U.S.C. § 119 from U.S. Provisional Patent Application No. 63/482,405 entitled "Intelligent Planning Incorporating Heart Valve Repair Prediction Model to Personalize Treatment," filed on Jan. 31, 2023, the disclosure of which is hereby incorporated by reference in its entirety for all purposes.

TECHNICAL FIELD

The present specification generally relates to generative computational predictive models, and more specifically relates to generative computational predictive models for soft tissue repair planning.

BACKGROUND

Heart valve disease is a major component of heart disease impacting all four heart valves (aortic, mitral, pulmonic, and tricuspid). For example, Mitral regurgitation (MR) is the leading cause of heart valve disease in western countries, where moderate MR is present in at least 1.7% of adults, increasing to 11.7% in those aged 75 years and older. The disease occurs when the two leaflets of the mitral valve (MV) do not close properly during systole. Similarly, conditions like Tricuspid Regurgitation and Aortic Regurgitation are both common, necessitating treatment through either surgical methods (such as open-heart procedures) or trans-catheter repair or replacement using devices.

For treatment of symptomatic moderate-to-severe or severe MR in patients deemed high-risk for surgical treatment by a heart team, a mitral valve clip, such as Abbott's MitraClip™, or a transcatheter edge-to-edge repair device, such as Edwards Pascal™, may be used. MitraClip™ and Pascal™ are the only FDA approved transcatheter repair device with CE mark approval. While surgical repair is still considered to be gold standard, trans-catheter repair with such devices is changing the paradigm of MR treatment, with over 100,000 implantations worldwide—15,000 of which were performed in the United States, overtaking surgical repair rates. Overall there are many surgical and transcatheter techniques to repair the valve and the decision to adopt a particular technique depends on patient's clinical and anatomical factors.

Although patients treated with mitral clip devices often have reduced regurgitation and improved prognosis overall, residual regurgitation and elevated post-clip MV pressure gradient (MVG) are concerning. In general, after any repair (surgical or transcatheter), there is a chance of regurgitation and increased pressure gradient. Assessment of MVG during the mitral clip device procedure is important, as leaving patients with gradients of 5 mmHg or more is undesirable and can lead to iatrogenic mitral stenosis, worsening patient prognosis. Similarly leaving patients with moderate regurgitation is also undesirable. Therefore, accurate prediction of post-clip MVG and MR is necessary to assess patient candidacy for a mitral clip device. Current approaches for mitral interventions are full-scale, patient-specific computational simulations that are time consuming and/or have yet to be applied to and demonstrate prediction accuracy across multiple patients.

For treatment of aortic valve insufficiency (AI), with or without aortic root pathology, aortic valve repair has become an attractive alternative to valve replacement procedures. Aortic valve repair helps patients avoid the long-term risks of valve replacement with a prosthetic heart valve. These include prosthetic valve deterioration, anticoagulation related complications, thromboembolism, and endocarditis. These procedures are valve sparing; thus, the patient's native heart valve is repaired instead of replaced with a bioprosthetic heart valve.

All patients diagnosed with primary Aortic Insufficiency (AI) are candidates for aortic valve repair. Physicians also consider the amount of healthy cusp tissue available when deciding if a patient will be a candidate to undergo a successful aortic valve repair surgery. Patients who have extremely calcified leaflets, or stiff leaflets caused by endocarditis or rheumatic heart disease are not candidates for valve sparing surgical procedures.

There are various surgical repair techniques that can be used to repair various aspects of aortic valve pathology. Surgical techniques to repair the aortic root and annulus include using a Dacron™ graft to replace the ascending aorta, or reimplantation of the aortic valve, which is a technically challenging procedure. Additionally, there are various cusp repair techniques. One of the most common cusp pathologies in AI patients is cusp prolapse. This can be surgically corrected by free margin plication or free margin resuspension. The goal of these techniques is to achieve a cusp coaptation height at the mid-level of the sinuses of Valsalva. These techniques become even more complex in patients with Bicuspid Avs as management of the raphe and pseudo-commissures is an important step in achieving a good clinical outcome in these patients. Currently, experts in the field of aortic valve repair state that it is not a more widely applicable treatment option because of the lack of surgeons with the appropriate expertise and experience in the field. However, as more patients are becoming aware of valve sparing procedures, this is expected to rapidly change.

The description provided in the background section should not be assumed to be prior art merely because it is mentioned in or associated with the background section. The background section may include information that describes one or more aspects of the subject technology.

SUMMARY

According to certain aspects of the disclosed technology, systems and methods are provided for pre-operatively planning medical surgical repair, such as, but not limited to heart valve repair procedures. Certain aspects of the disclosed technology provide a simplified predictive framework for MVG prediction immediately after mitral valve clip deployment. Such aspects of the disclosed technology provide improvements to MVG prediction accuracy and paves the way to predicting residual MR. Certain aspects of the disclosed technology provide a computational modeling framework that allows surgeons to pre-surgically plan AV repair procedures by generating various "repair options" and the predicted valve functional outcomes for each option. The repair itself may include implantation of a repair device. The surgical approach for each repair option may vary between open heart and/or trans-catheter interventional approaches. The physician/surgeon can compare the different predictions on the performance of the patient specific valve after the repair is completed in order to make a final plan for the actual surgical procedure. The computational modeling algorithm can predict post-operative valve pressure gradient, effective orifice area, leaflet coaptation, regurgitant fraction, as well as the future remodeling of the valve and ventricle.

According to certain aspects of the present disclosure, a computer-implemented method includes receiving a 3D imaging of a heart valve in a pre-operative state. The method includes generating a segmented heart valve by segmenting the heart valve of the 3D imaging. The method includes simulating a surgical procedure on the parameterized heart valve. The method includes determining at least one post-operative outcome based on simulating the surgical procedure on the parameterized heart valve. Systems and machine-readable media are also provided.

According to other aspects of the present disclosure, a system is provided. The system includes a memory including instructions and a processor configured to execute the instructions which, when executed, cause the processor to receive a 3D imaging of a heart valve in a pre-operative state. The processor is configured to execute the instructions which, when executed, cause the processor to generate a segmented heart valve by segmenting the heart valve of the 3D imaging. The processor is configured to execute the instructions which, when executed, cause the processor to simulate a surgical procedure on the parameterized heart valve. The processor is configured to execute the instructions which, when executed, cause the processor to determine at least one post-operative outcome based on simulating the surgical procedure on the parameterized heart valve.

According to other aspects of the present disclosure, a non-transitory machine-readable storage medium comprising machine-readable instructions for causing a processor to execute a method is provided. The method includes receiving a 3D imaging of a heart valve in a pre-operative state. The method includes generating a segmented heart valve by segmenting the heart valve of the 3D imaging. The method includes simulating a surgical procedure on the parameterized heart valve. The method includes determining at least one post-operative outcome based on simulating the surgical procedure on the parameterized heart valve. Systems and machine-readable media are also provided.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various ways, all without departing from the scope of the present disclosure. Accordingly, the drawings and description are to be regarded as illustrative in nature and not restrictive.

It should be understood that while the disclosed systems and methods described below are in the context of soft tissue repair treatment procedures for various cardiovascular diseases, the disclosed technology can be extended and is applicable for other fields such as orthopedics, plastic surgery, and other appropriate fields. The disclosed technology is applicable for any soft tissue repair where a surgeon can manipulate the tissue with or without devices and needs immediate prediction of functional outcomes of those repair steps on the organ/tissue being repaired.

Figure 1:
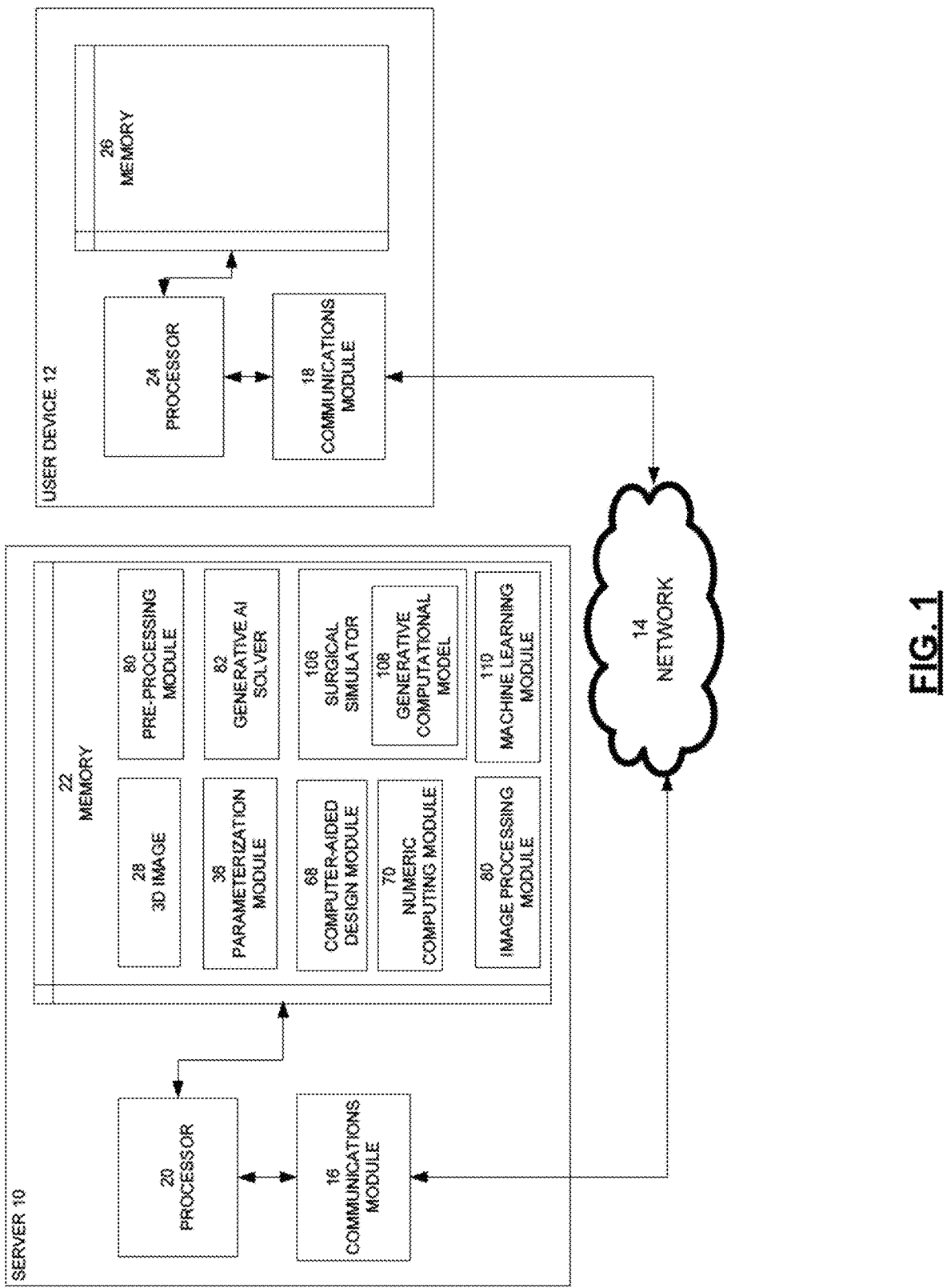
FIG. 1 is an example block diagram of a server and a user device according to certain aspects of the disclosure.
Figure 2A:
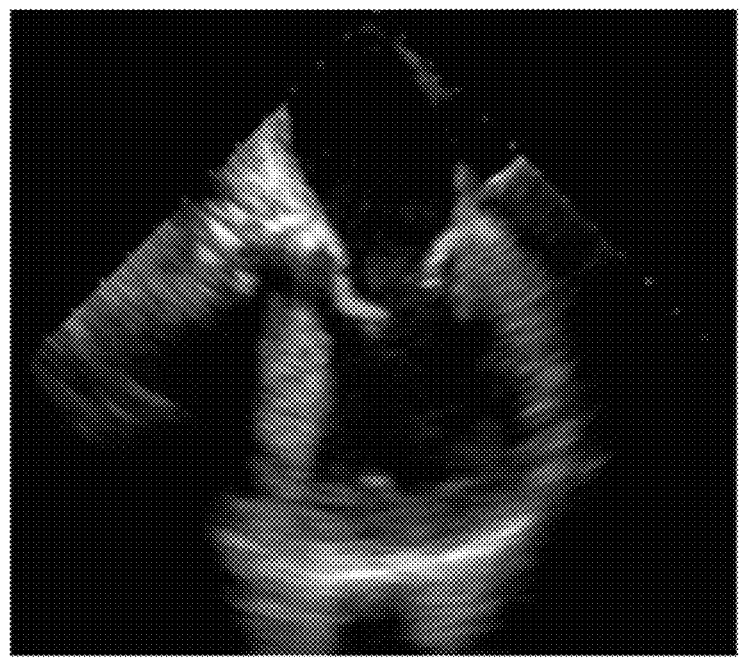
FIG. 2A illustrates a 3D image exemplarily depicted as a pre-clip transesophageal echocardiography scan of a patient.
Figure 2B:
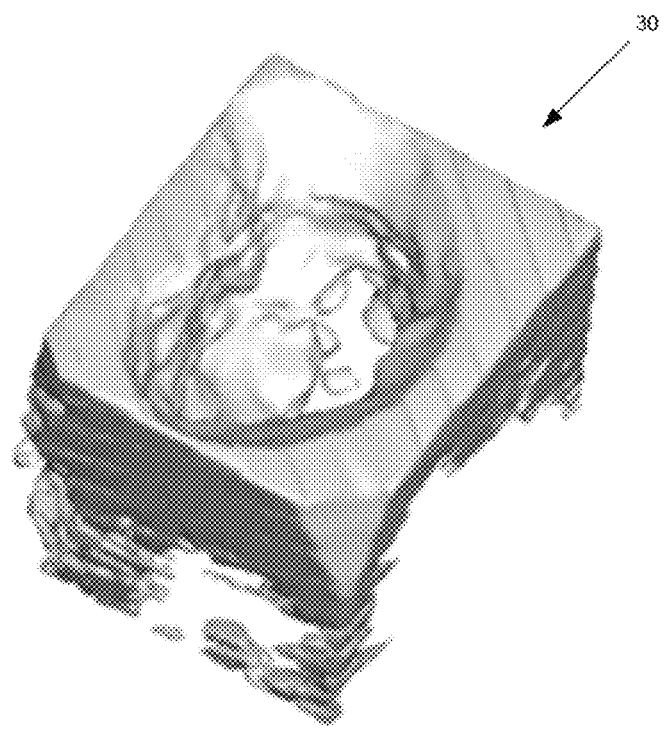
FIG. 2B illustrates a segmentation process of a mitral valve of the 3D image of FIG. 2A where the mitral valve is segmented in peak diastole, according to certain aspects of the disclosure.
Figure 2C:
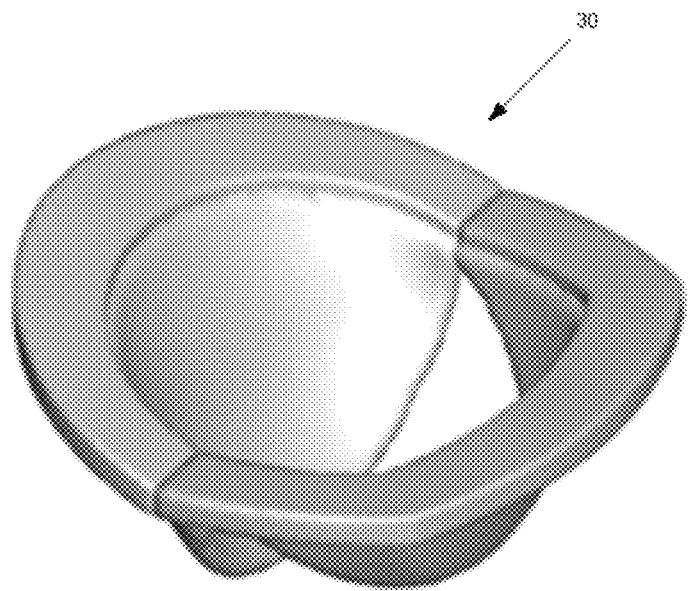
FIG. 2C illustrates a parameterized mitral valve after the segmentation process depicted in FIG. 2B, according to certain aspects of the disclosure.
Figure 2D:
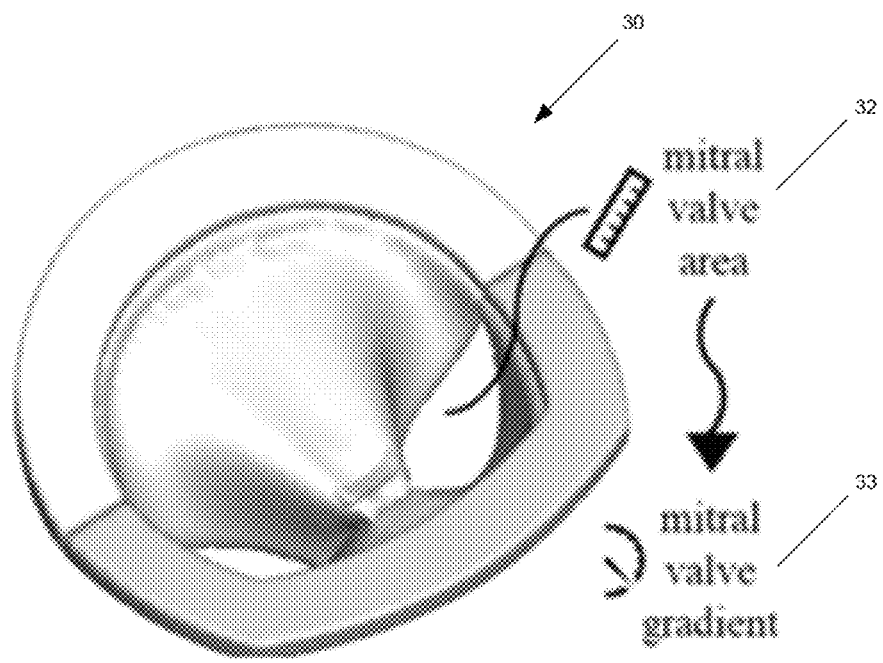
FIG. 2D illustrates an edge-to-edge repair simulation performed on the parameterized mitral valve of FIG. 2C, according to certain aspects of the disclosure.

FIG. 1 is a block diagram illustrating a server 10 and a user device 12 connected over a network 14, according to certain aspects of the disclosure. It should be understood that for purposes of explanation the user device 12 is described, but any number of the user device 12 could be used.

The server 10 can be any device having an appropriate processor, memory, and communications capability for communicating with the user device 12. For purposes of load balancing, the server 10 may include multiple servers. The user device 12, to which the server 10 communicates with over the network 14, can be, for example, a tablet computer, a mobile phone, a mobile computer, a laptop computer, a portable media player, an electronic book (eBook) reader, or any other device having appropriate processor, memory, and communications capabilities. In certain aspects, the server 10 can be a cloud computing server of an infrastructure-as-a-service (IaaS) and be able to support a platform-as-a-service (PaaS) and software-as-a-service (SaaS) services.

The network 14 can include, for example, any one or more of a personal area network (PAN), a local area network (LAN), a campus area network (CAN), a metropolitan area network (MAN), a wide area network (WAN), a broadband network (BBN), the Internet, and the like. Further, the network 14 can include, but is not limited to, any one or more of the following network topologies, including a bus network, a star network, a ring network, a mesh network, a star-bus network, tree or hierarchical network, and the like.

The server 10 and the user device 12 are connected over the network 14 via respective communication modules 16, 18. The communication modules 16, 18 are configured to interface with the network 14 to send and receive information, such as data, requests, responses, and commands to other devices on the network 14. The communications modules 16, 18 can be, for example, modems or Ethernet cards.

The server 10 includes a processor 20, the communications module 16, and a memory 22. The processor 20 of the server 10 is configured to execute instructions, such as instructions physically coded into the processor 20, instructions received from software in the memory 22, or a combination of both. The processor 20 of the server 10 is configured to perform functions as described herein.

The user device 12 includes a processor 24, the communications module 18, and a memory 26. The processor 24 of the user device 12 is configured to execute instructions, such as instructions physically coded into the processor 24, instructions received from software in the memory 26, or a combination of both. The processor 24 of the user device 12 is configured to perform functions as described herein.

Any imaging (e.g., computed tomography (CT), magnetic resonance imaging (MRI), transesophageal echocardiogram (TEE), intracardiac echocardiography (ICE), echocardiogram (ECHO)) capable of producing a 3D imaging 28 will be the input for the computational algorithm of the server 10.

FIGS. 2A-2D show the overall process for post-clip MVG prediction. First, a 3D pre-clip transesophageal echocardiography scan (e.g., 3D imaging 28), for example, is acquired for each patient (step 1 in FIG. 2A). Next, the mitral valve (MV) 30 geometry of the 3D pre-clip transesophageal echocardiography scan is segmented in peak diastole (step 2 in FIG. 2B). The MV 30 is then simplified by parameterization based on annular commissural and septolateral dimensions and leaflet lengths (step 3 in FIG. 2C), as explained in more detail below. Using a reduced-order simulation, or a full-order simulation, or an generative AI simulation, the mitral valve clip procedure is simulated to produce the post-clip geometry of the MV 30 in accordance with the number of devices implanted, total MV area (MVA) 32 is measured at the leaflet tips 34, and post-clip mitral valve gradient (MVG) 33 is estimated (step 4 in FIG. 2D). The simulation itself allows the user to be able to control where and how to deploy the device (e.g., mitral valve clip) or manipulate the anatomy in an interactive manner before letting the simulation complete the prediction of the post procedural anatomy (e.g., at least one post-operative outcome).

Simplified Mitral Valve Geometry

Optionally, it may be useful to increase efficiency and reduce time to make predictions and increase efficiency of the interactive user experience by simplifying complex geometries. With reference to FIGS. 3A-3I, in order to simplify MV geometries, a parameterization module 36 is utilized such that all MVs align in a generalized model in a modified coordinate system. The MV parameterization approach via the parameterization module 36 is described further below.

The parameterization method utilizes the 3D imaging 28, such as, for example, CT scans of patients. Each MV 30 is segmented in diastole (step 1 in FIG. 3A). Key points are selected to characterize each MV 30, which include the anterior annulus point 38, posterior annulus point 40, commissural points 42, A2 point 44, and P2 point 46 (step 2 in FIG. 3B). Additional points from the annulus to the leaflet tip are selected to capture central leaflet curvature.

Key measures are calculated, such as the commissural dimension 48 (defined at the level of the annulus) and anterior-posterior (AP) annular dimensions and leaflet, to define leaflet curvature. A series of scaling is performed in the direction of the scaling dimension. Each MV 30 is scaled by the commissural dimension 48 (step 3 in FIG. 3C). From the side view, each MV 30 is depicted as two triangles (e.g., an anterior mitral valve (MV) triangle 50 and a posterior mitral valve (MV) triangle 52) with a common point (e.g., one of the commissural points 42) (step 4 in FIG. 3D)—the anterior mitral valve triangle 50 for the anterior MV (anterior annulus and leaflet) and the posterior mitral valve triangle 52 for the posterior MV (posterior annulus and leaflet).

Figure 3A:
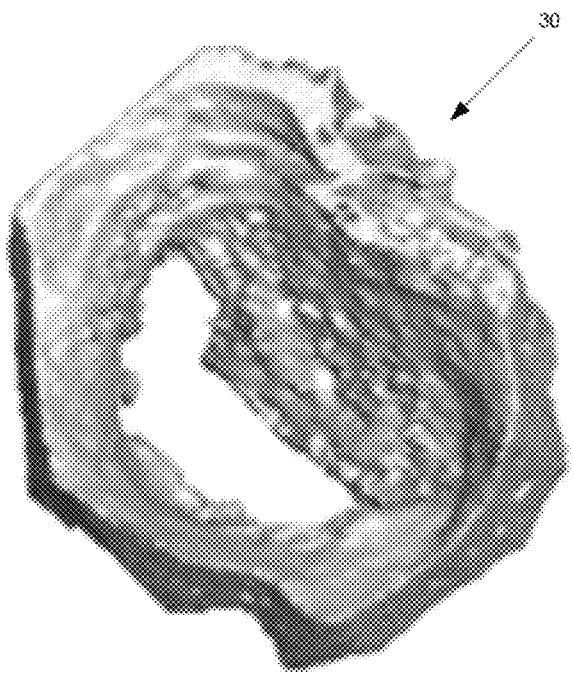
FIG. 3A is a segmented mitral valve taken from a 3D image.
Figure 3B:
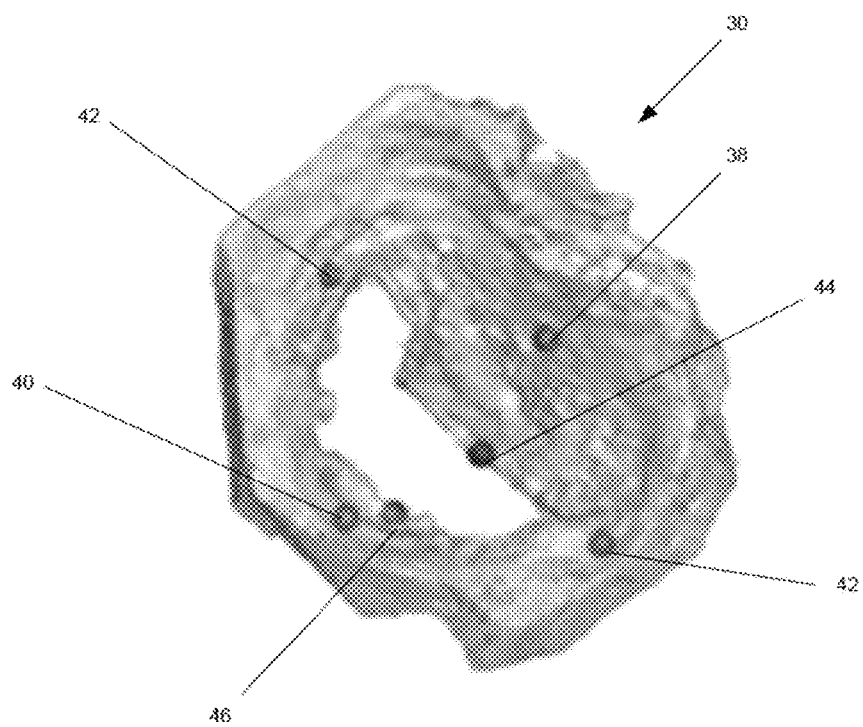
FIG. 3B illustrates key point selection of the segmented mitral valve of FIG. 3A.
Figure 3C:
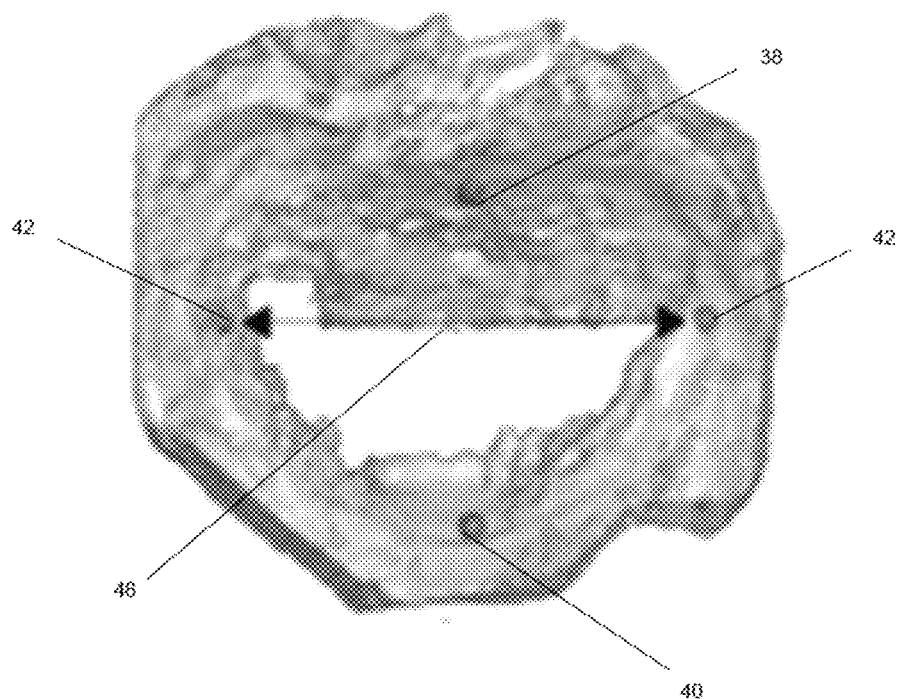
FIG. 3C illustrates scaling of the mitral valve by commissural dimension after the key point selection depicted in FIG. 3B.
Figure 3D:
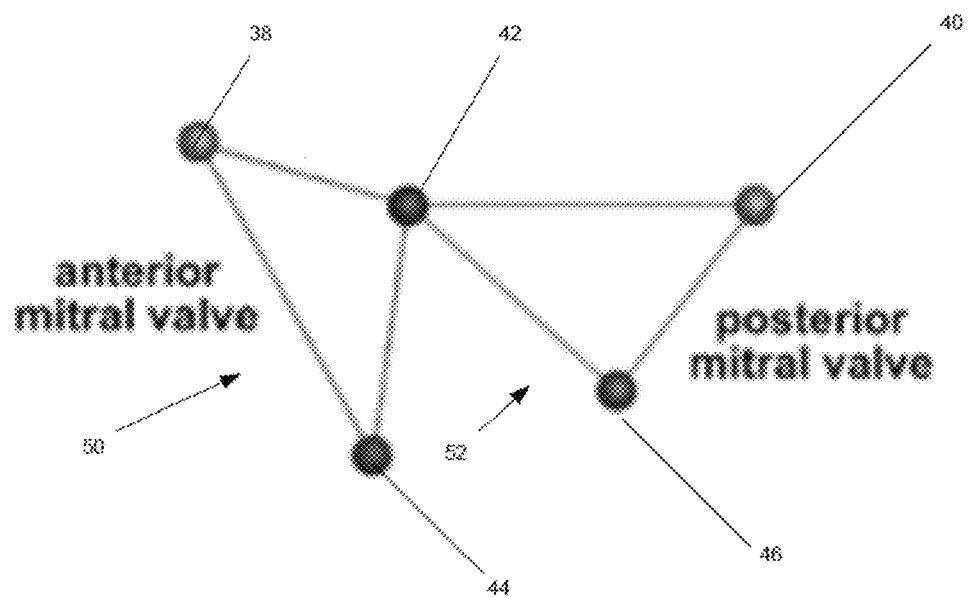
FIG. 3D illustrates scaling of a posterior of the mitral valve after the scaling depicted in FIG. 3C.
Figure 3E:
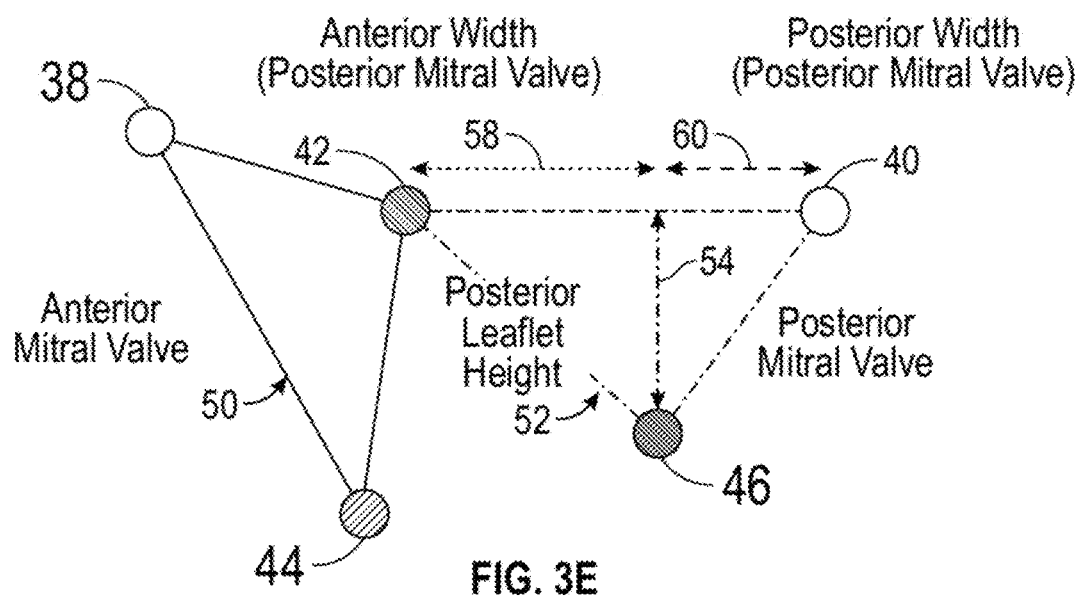
FIG. 3E illustrates charted results of the scaling of the posterior of the mitral valve depicted in FIG. 3D.
Figure 3F:
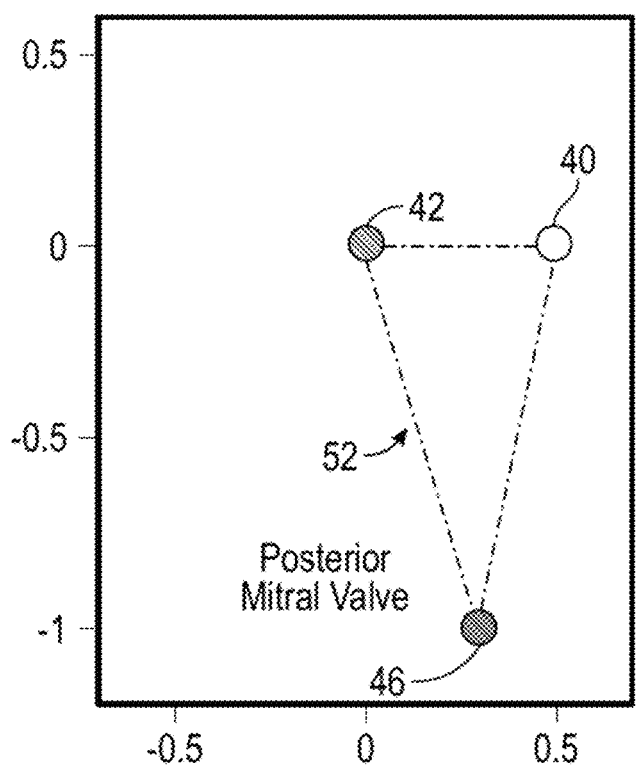
FIG. 3F illustrates a side view of an anterior mitral valve triangle and a posterior mitral valve triangle.

The posterior MV triangle 52 is then scaled by a posterior leaflet height 54 (step 5 in FIG. 3E). An anterior portion 56 of the posterior MV triangle 52 is scaled by a first anterior width 58 and a posterior portion 60 of the posterior MV triangle 52 is scaled by a posterior width 62, modified such that P2 point 46 is at 0.3 units and the posterior MV triangle 52 is 0.5 units wide (step 5 in FIG. 3E). The result is shown in step 6 in FIG. 3F.

Figure 3G:
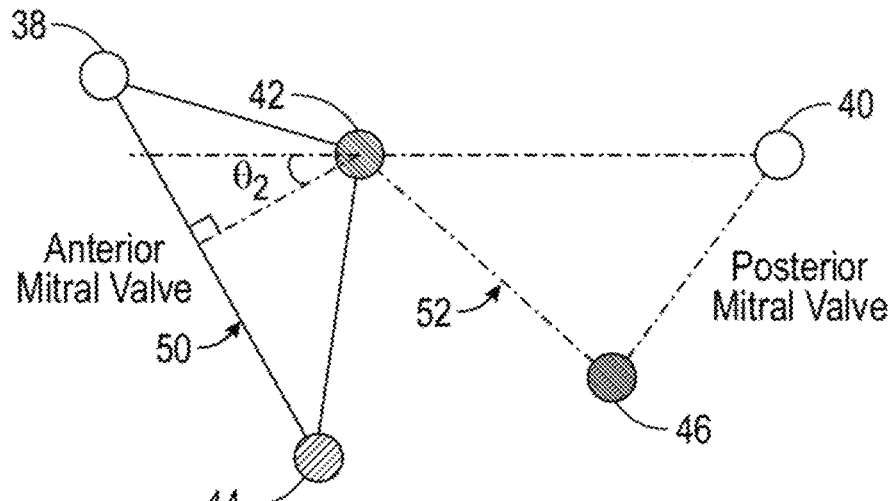
FIG. 3G illustrates rotation of the anterior mitral valve triangle.
Figure 3H:
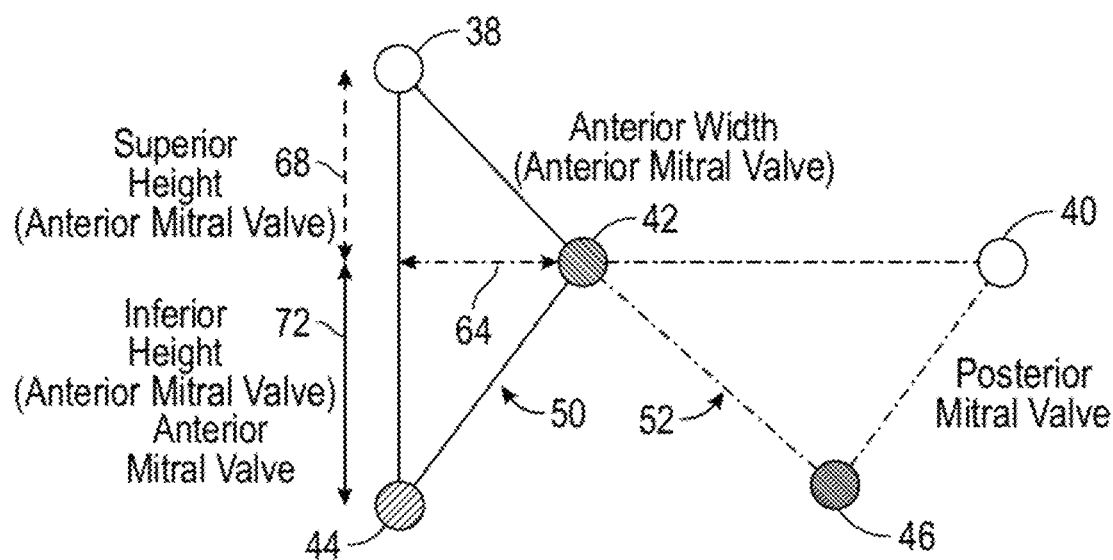
FIG. 3H illustrates scaling of the anterior mitral valve triangle after rotation depicted in FIG. 3F.
Figure 3I:
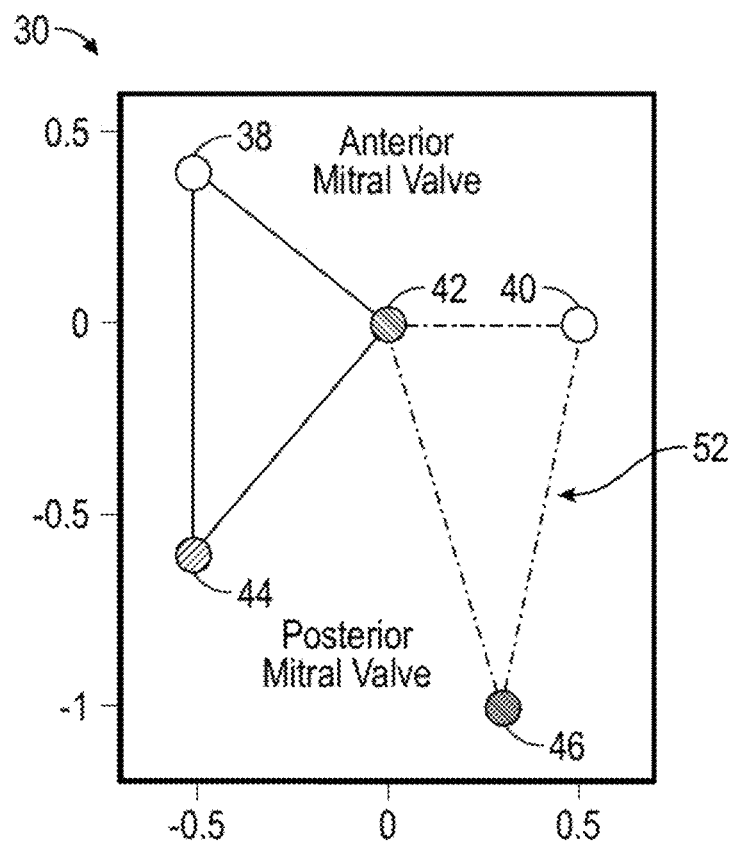
FIG. 3I illustrates a side view of the resulting parameterized mitral valve.

The anterior MV triangle 50 is then rotated such that the line created by the anterior annulus and A2 point 44 becomes vertical (step 7 in FIG. 3G, see FIG. 3H). The anterior MV triangle 50 is scaled by a second anterior width 64, modified such that the anterior MV triangle 50 is 0.5 units wide (step 8 in FIG. 3H). The superior portion 66 of the anterior MV triangle 50 is scaled by the superior height 68 and the inferior portion 70 of the anterior MV triangle 50 is scaled by the inferior height 72, modified such that the superior portion 66 of the anterior MV triangle 50 is 0.4 units tall and the inferior portion 70 of the anterior MV triangle 50 is 0.6 units tall (step 8 in FIG. 3H). The resulting parameterized MV 30 is shown in the side view in step 9 in FIG. 3I.

Figure 4:
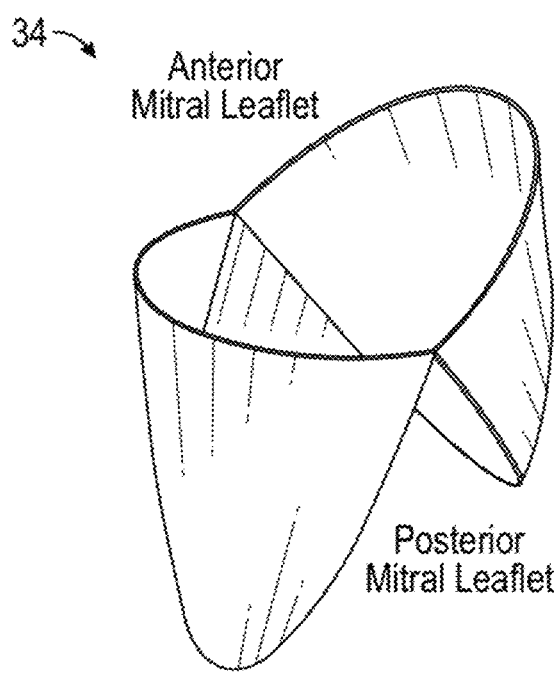
FIG. 4 is a collapsed parameterized mitral valve of FIG. 3I.

Referring to FIG. 4, leaflet curvature of the resulting parameterized MV 30 is assessed, and a collapsed parameterized MV base model is generated via a computer-aided design module 68.

To create simplified geometries of patient MV 30, the reverse of the parameterization method is performed via a numeric computing module 70 to modify the collapsed parameterized MV 3D model using published STL reader and writer functions. Input parameters include annular commissural and septolateral dimensions and leaflet lengths. The above description of generating a parametrized model is one example and other appropriate methods that generate parametrized models with more parametric variables are within the scope of the present disclosure. Increasing the number of variables can allow more detailed features of the MV to be captured, including not limited to pathological features such as clefts, indentations, additional cusps etc.

Mitral Valve Clip Simulation

Figure 5A:
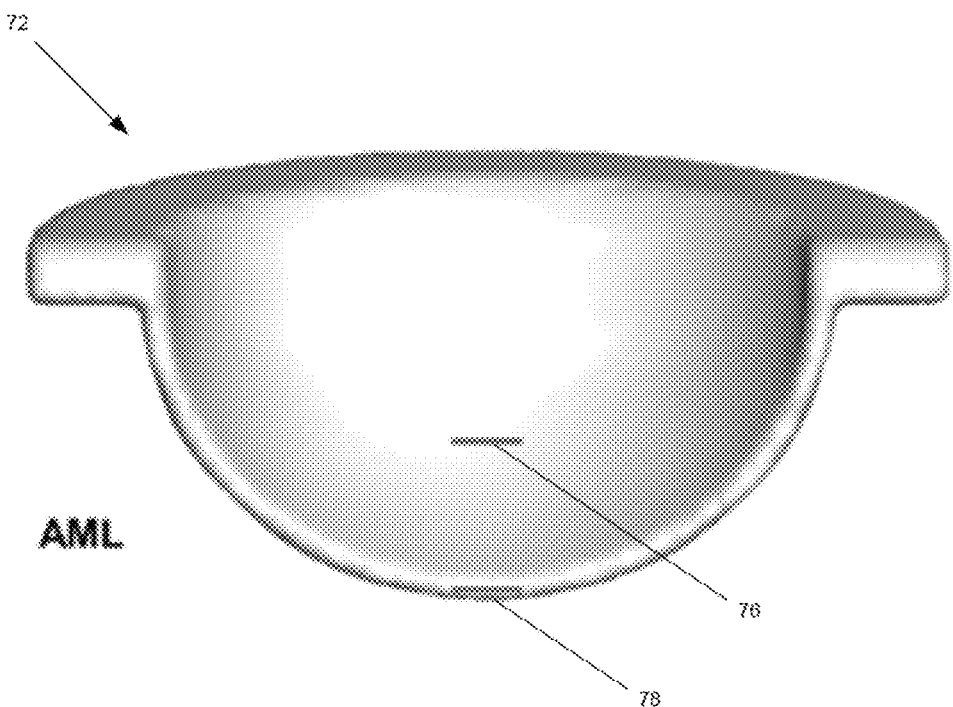
FIG. 5A illustrates an anterior mitral leaflet with top and bottom mitral valve clip segment pairs.
Figure 5B:
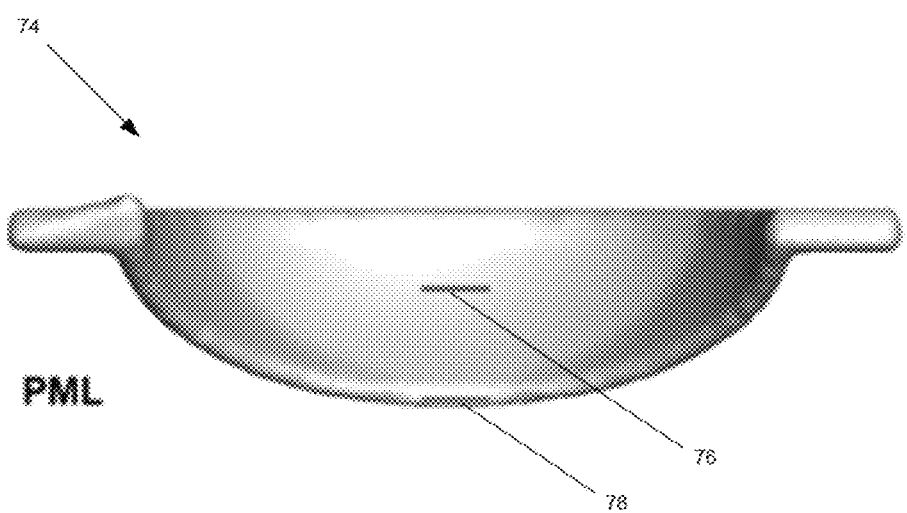
FIG. 5B illustrates a posterior mitral leaflet with top and bottom mitral valve clip segment pairs.

With reference to FIGS. 5A and 5B, pre- and post-clip transesophageal echocardiograms are obtained for MR patients. Each MV 30 geometry is simplified and imported into an in-house reduced-order model program on the server 10. In certain aspects, the simulation can be a full-order model or a generative AI model. Central mitral valve clip implantation is simulated on the user device 12 via the server 10. The mitral valve clip is simplified as the footprint of the mitral valve clip of interest as a pair of segments on each leaflet (e.g., an anterior mitral leaflet 72 and a posterior mitral leaflet 74) of the MV 30 representing the top 76 and bottom 78 of the mitral valve clip. In certain aspects, the mitral valve clip need not be simplified and precise mitral valve clip details may be included.

Post-Mitral Valve Clip Mitral Valve Gradient Prediction

MVG is defined clinically as the mean valve gradient by the simplified Bernoulli's equation through diastole measured by CW doppler. Estimation of simulated post-clip MVG stems from patient pre-clip MVG. First, the mean diastolic pre-clip mitral volumetric flowrate is calculated using patient pre-clip MVA and MVG by manipulation of the simplified Bernoulli's equation, shown in Equation (1).

$$Q_{mean} = MVA_{in\ vivo} \sqrt{\frac{MVG_{in\ vivo}}{4}} \qquad (1)$$

In certain aspects, similar models can be deployed to predict other post-operative outcomes, such as, but not limited to, MV regurgitation, a regurgitant orifice area, a velocity waveform in the pulmonary artery, and left atrial pressure, and other appropriate post-operative outcomes.

In the same manner, this flowrate is applied to calculate the simulated MVG based on the simulated MVA, as shown in Equation (2).

$$MVG_{simulated} = 4\left[\frac{Q_{mean}}{MVA_{simulated}}\right]^2 \qquad (2)$$

The in vivo and simulated post-clip MVGs are compared.

Alternative Method: Patient Anatomy and Simulation Expansion

Alternative to the simplified MV geometry used above, the patient's full MV apparatus can be used, including the leaflets, chordae tendineae, papillary muscles, and annulus. To move towards multiphase modeling, the annulus and papillary muscles in the systolic and diastolic phases are to be incorporated.

Similar to the parameterized MV method above, here, the MV leaflets are segmented during diastole as one part. Chordae tendineae are also represented in diastole, where the chordal leaflet insertion and insertion to the papillary muscles were defined by point pairs, with three per papillary muscle per leaflet. The papillary muscles are segmented in both diastole and systole, focusing on the head movement where chordal insertion lies. This allows incorporation of influence of chordae tendineae in both diastole and systole, which influence valve opening, valve closing, MVG, and residual MR. Key points (12 in systole and 14 in diastole) are acquired around the annulus to capture the potential impact of annular motion on the post-mitral valve clip geometry.

The points and segmented geometries are next exported from an image processing module 80 for post-processing for preparing mitral anatomies for the present mitral valve clip simulation.

Figure 6A:
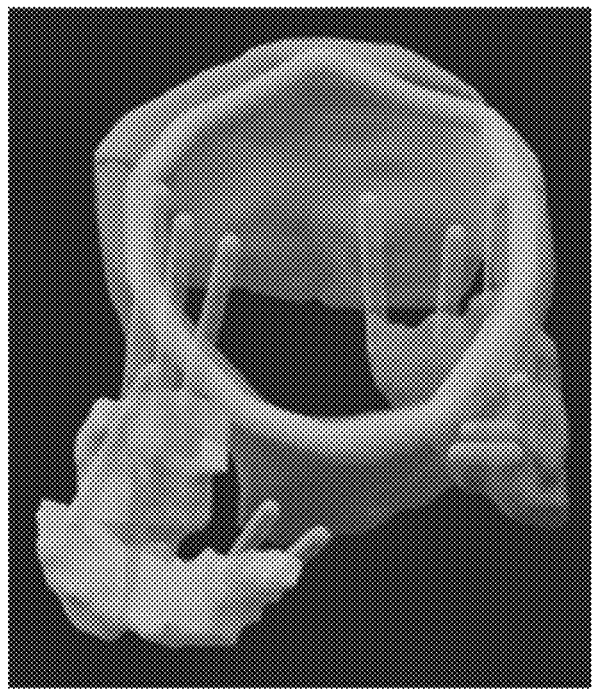
FIG. 6A illustrates a post-processed mitral valve in diastole.
Figure 6B:
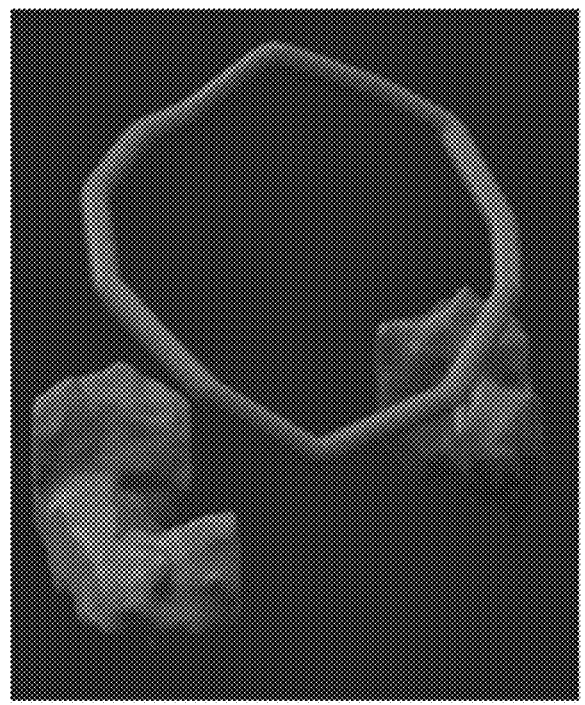
FIG. 6B illustrates a post-processed mitral valve in systole.

Annuli are generated using the points selected, chordae tendineae are generated using the point pairs selected, and the anterior and posterior leaflet are separated from one another. The papillary muscles are imported, and all geometries are remeshed, triangulated, and smoothed. Additionally, the mesh motion is tracked from diastole to systole for the reduced-order program. An example of the post-processed geometry is shown in FIGS. 6A and 6B.

Figure 7:
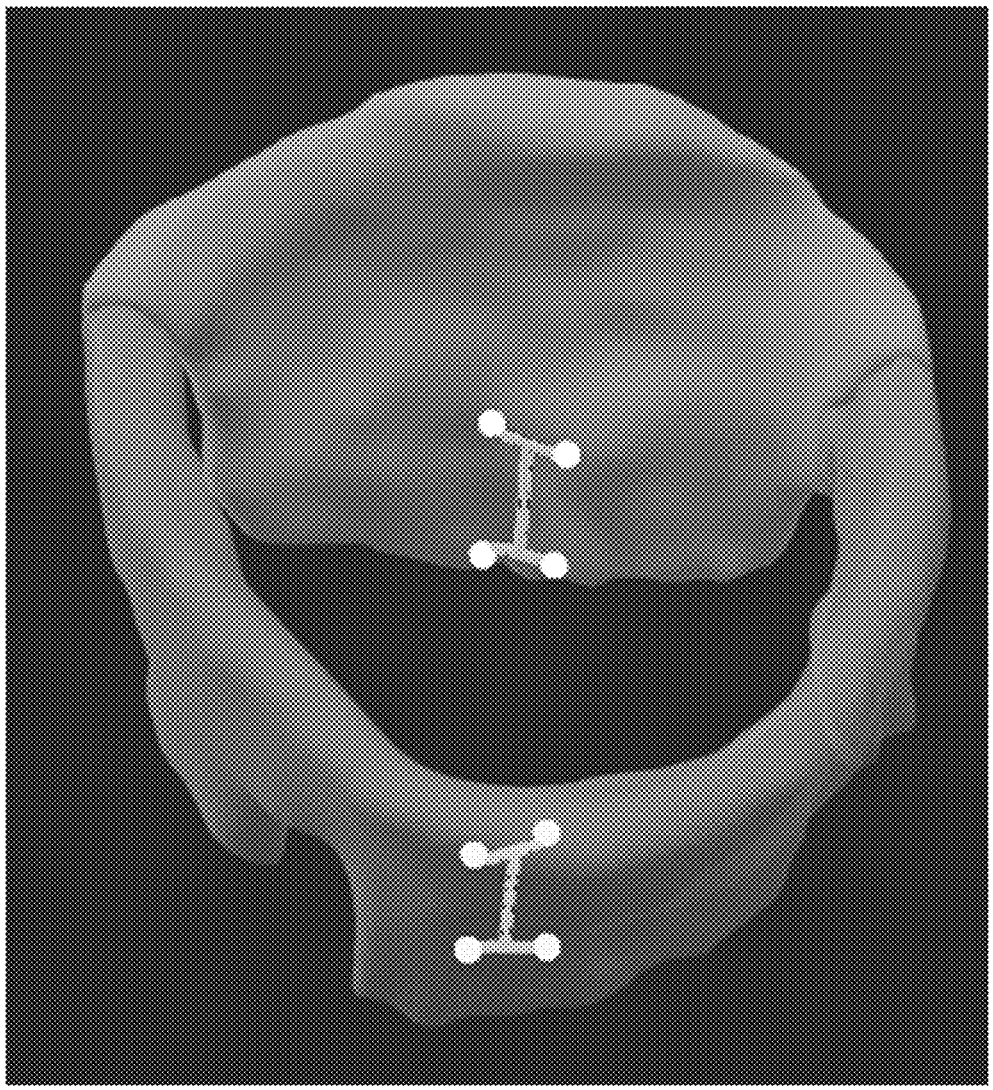
FIG. 7 illustrates a mitral valve clip footprint on the anterior mitral leaflet and the posterior mitral leaflet.

Similar to the method used above, the mitral valve clip is simplified as the footprint of the mitral valve clip of interest as a pair of segments on each leaflet. With the desired mitral valve clip size and location of implantation identified, the needed information for the mitral valve clip is automatically generated. An example of the mitral valve clip is shown for the patient anatomy in FIG. 7.

Figure 8:
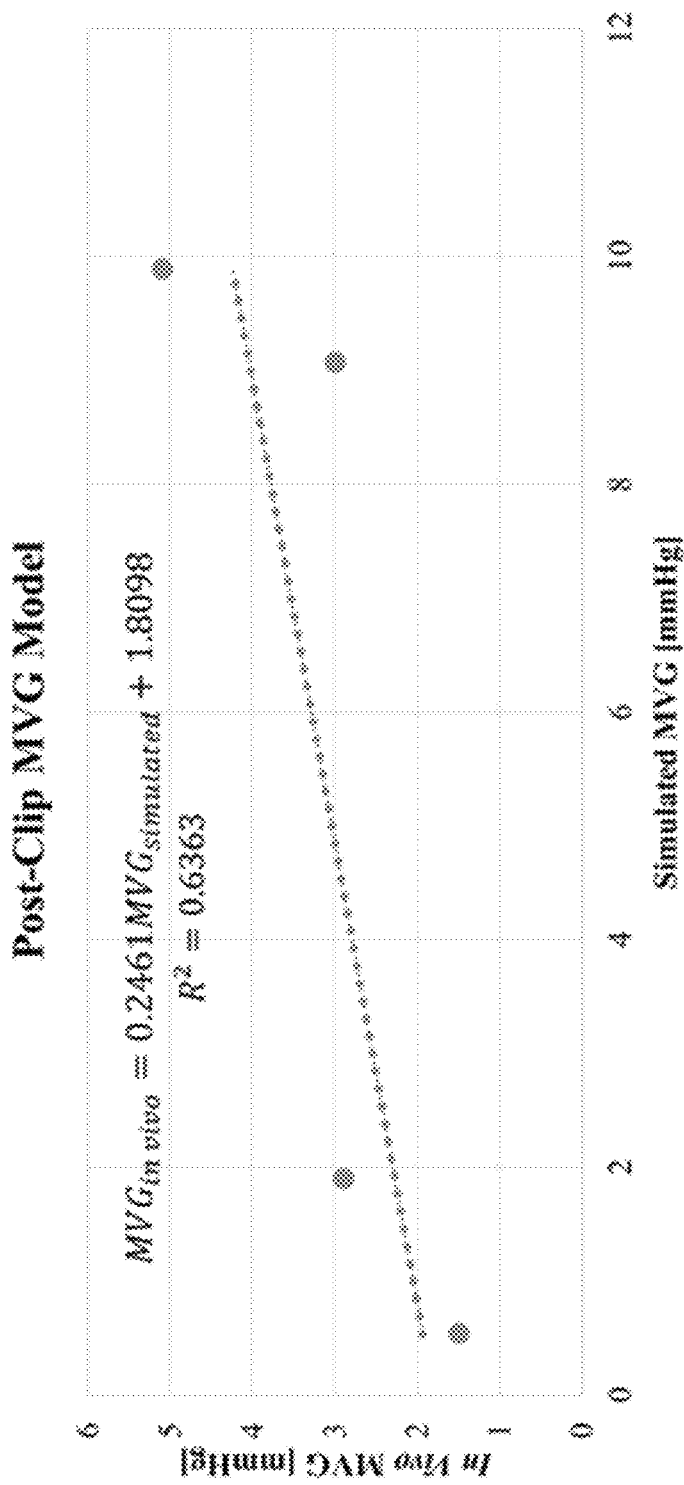
FIG. 8 is a chart illustrating in vivo vs simulated post-clip mitral valve gradient.

As illustrated in FIG. 8, the in vivo post-clip MVG is plotted against the simulated post-clip MVG, and the linear trendline formed is highlighted in Equation (3) with an R-squared value of 0.64.

$$MVG_{in\ vivo} = 0.2461 MVG_{simulated} + 1.8098 \quad (3)$$

Figure 9:
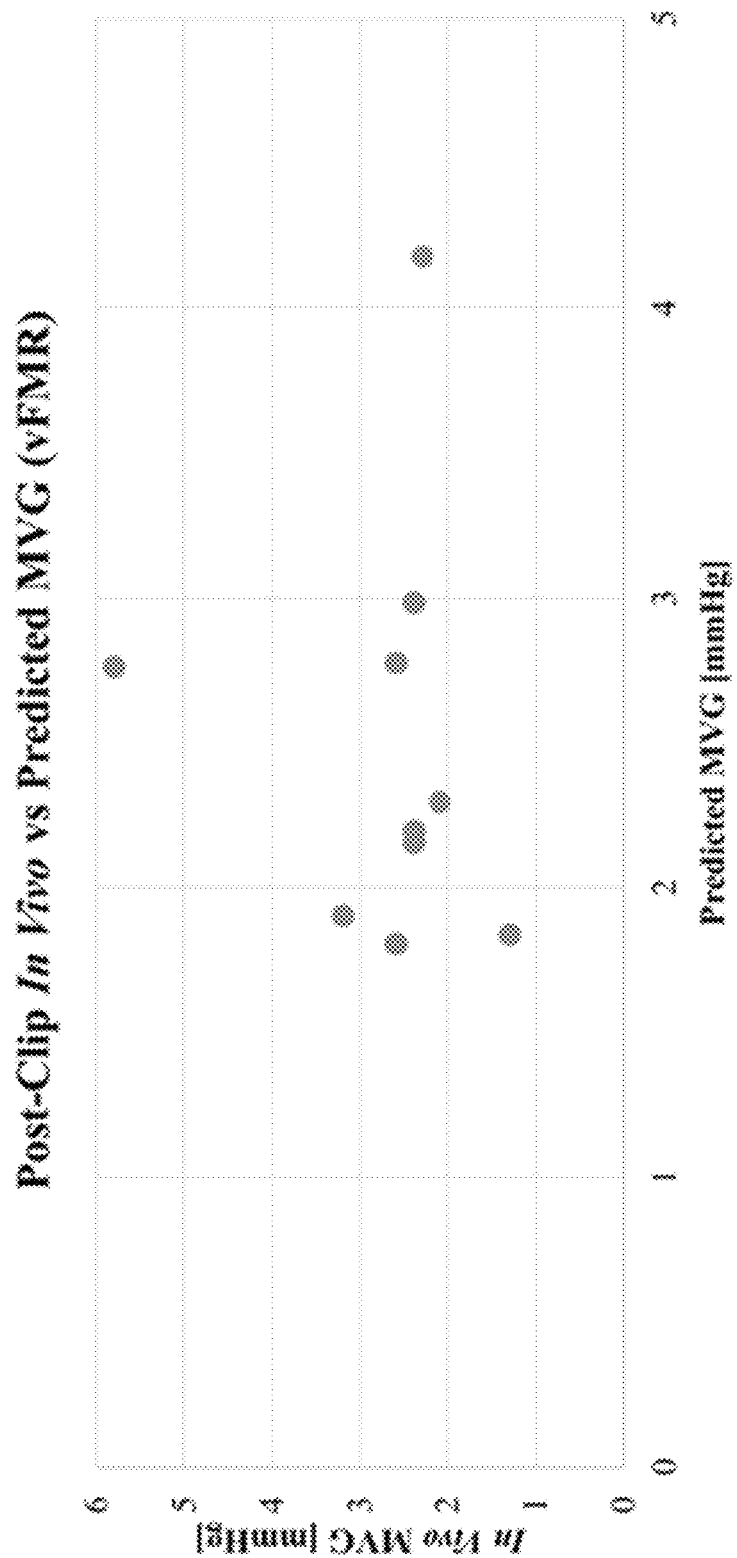
FIG. 9 is a chart illustrating post-clip in vivo vs predicted mitral valve gradient.

As illustrated in FIG. 9, for example, the predictive model is implemented on ten separate MR pts, and the post-clip in vivo vs predicted MVG.

Figure 10:
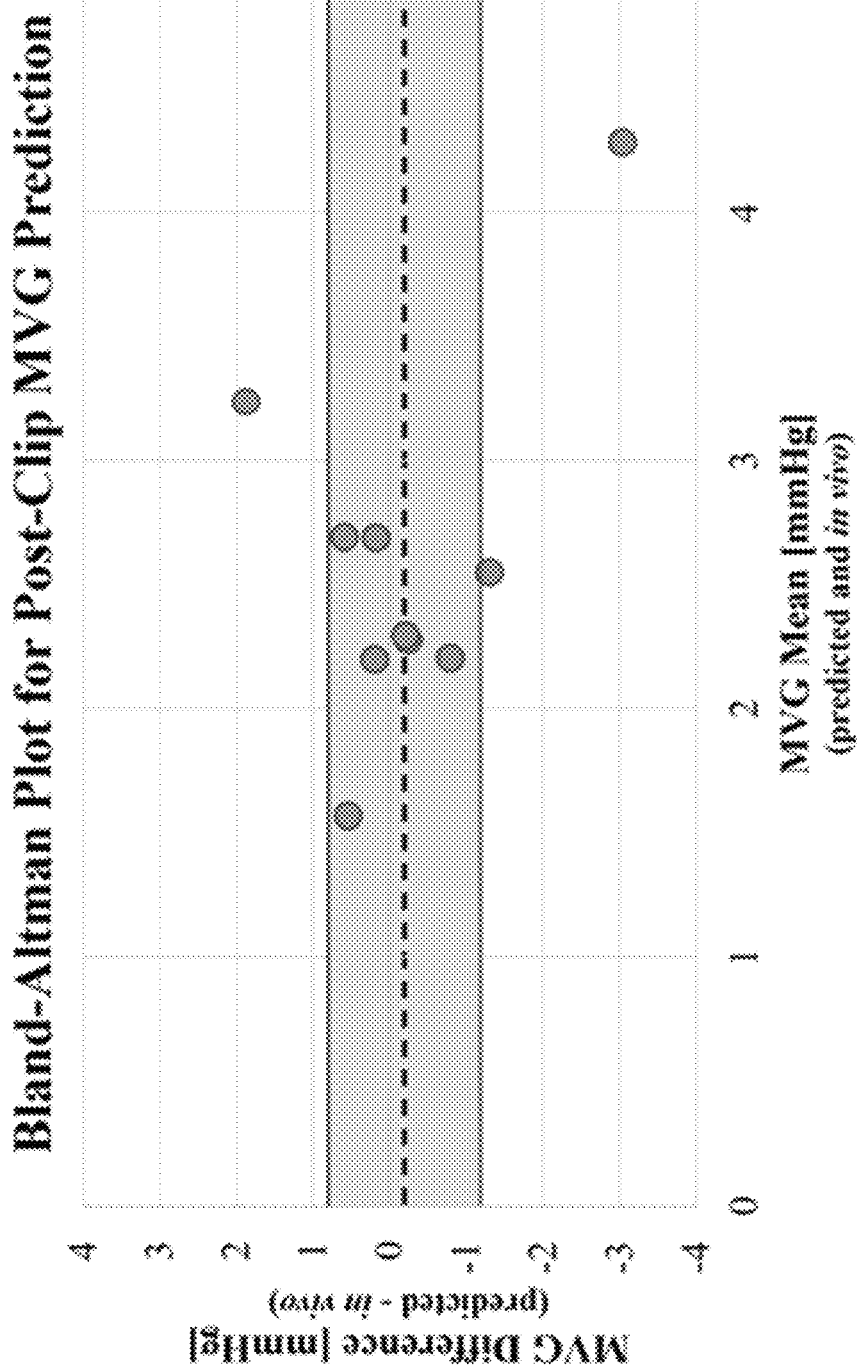
FIG. 10 is a chart illustrating Bland-Altman plot for post-clip mitral valve gradient prediction.

As depicted in FIG. 10, for example, assessment of this predictive model is performed using the Bland-Altman plot.

The Bland-Altman plot quantifies the agreement between the predicted and in vivo MVG. The dashed line shows the mean difference between predicted and in vivo MVG was −0.22 mmHg. The green area bordered by the solid blue lines indicate the acceptance criterion placed. This criterion was set to assess the ability of the model to yield a predicted MVG within 1 mmHg of the in vivo MVG. With this criterion, the predictive model shows 70% agreement across the ten patients assessed.

Figure 11A:
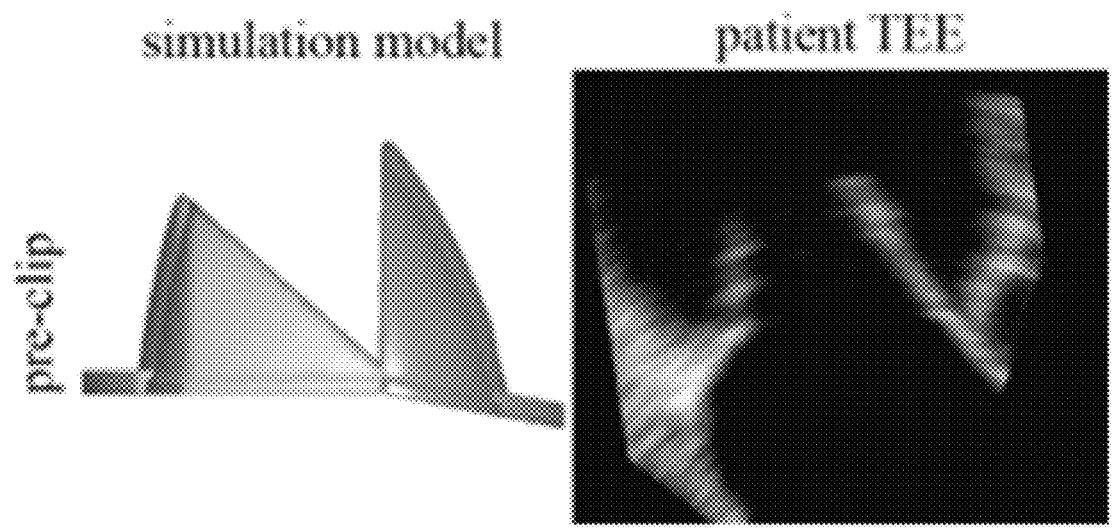
FIG. 11A illustrates a comparison of simulated and in vivo pre-clip mitral valve.
Figure 11B:
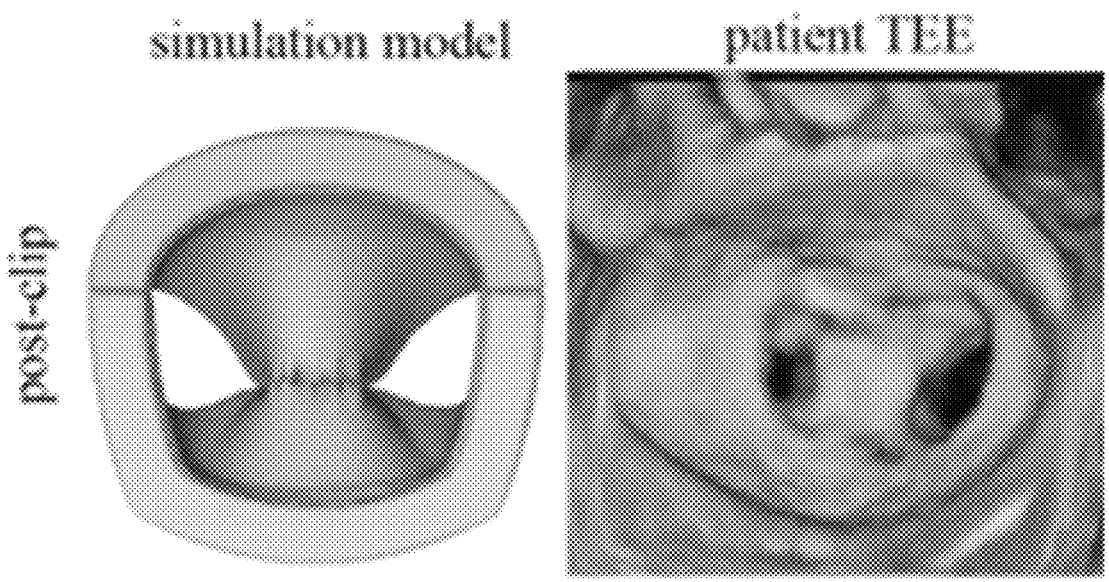
FIG. 11B illustrates a comparison of simulated and in vivo post-clip mitral valve.

By visual inspection, the MV simplification method and clipping simulation yielded similar geometry to in vivo imaging, as exemplified in FIGS. 11A and 11B.

Across the patients analyzed, an overall upward trend of in vivo vs simulated post-clip MVG formed, as expected. The correlation is appropriate, with an R-squared of 0.64. Improvement of the correlation can be improved through how the post-clip simulated MVG is calculated, for example for accounting for potential changes in cardiac function and hemodynamics that a patient may have with the repaired geometry.

Applying this model to ten other patients, for example, the Bland-Altman plot (see FIG. 10) shows appropriate model performance. The mean difference between the predicted and in vivo MVG is −0.22 mmHg, showing that the predicted MVG is overall slightly lower than the in vivo MVG. With acceptance criteria set to assess the ability of the model to yield a predicted MVG within 1 mmHg of the in vivo MVG, the model shows 70% agreement across the ten patients assessed. This shows that the simplified MVG predictive algorithm is capable of producing appropriate results.

Further embodiments of this framework includes use of a tuning dataset to adjust the model to better match simulated MVG to in vivo MVG. Additional parameters can be added using artificial intelligence and machine learning to capture other key aspects for a meaningful predictive model. Patient aspects include anatomical and physiological factors to capture patient variation across the MR population, including use of the patient's anatomy and multiple phases as detailed. Implant aspects include different clipping schemes and the impact of the number of devices implanted. An additional testing dataset can be used to assess the performance of the tuned model.

While the above pre-operatively planning medical surgical repair discussion focuses on mitral valve repair procedures, the following will focus on pre-operatively planning medical surgical repairs for aortic valve repair procedures.

Figure 12:
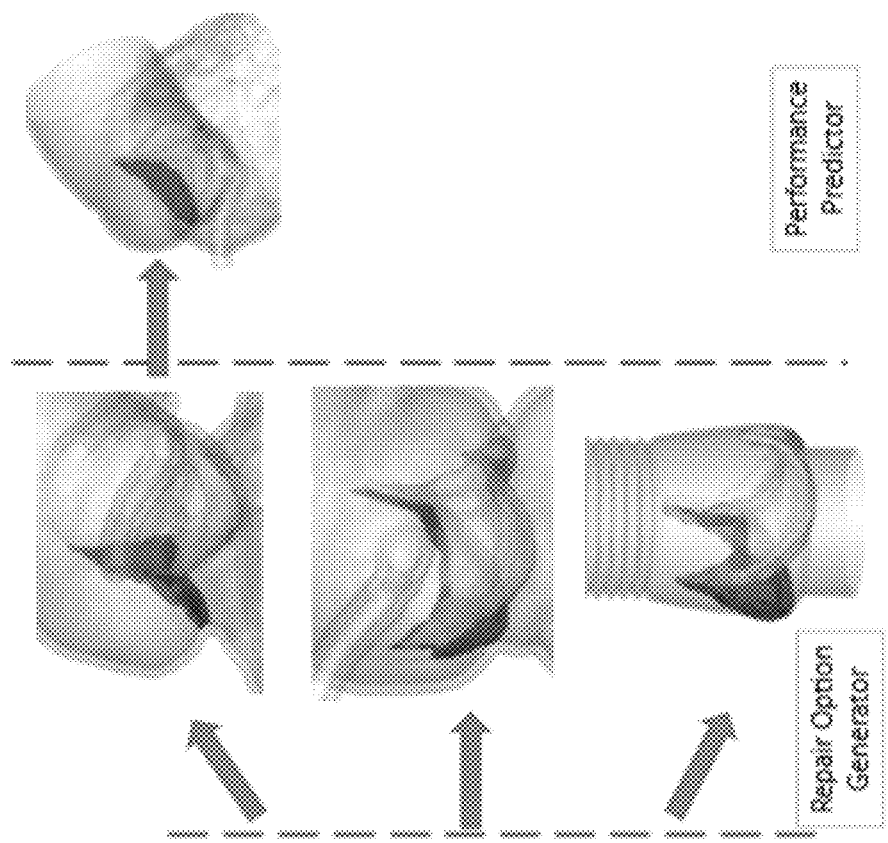
FIG. 12 is a flow chart illustrating generative computational modeling framework for various aortic valve repair surgical techniques to assist physicians plan complex procedures prior to open heart surgery, according to certain aspects of the disclosure.
Figure 12:
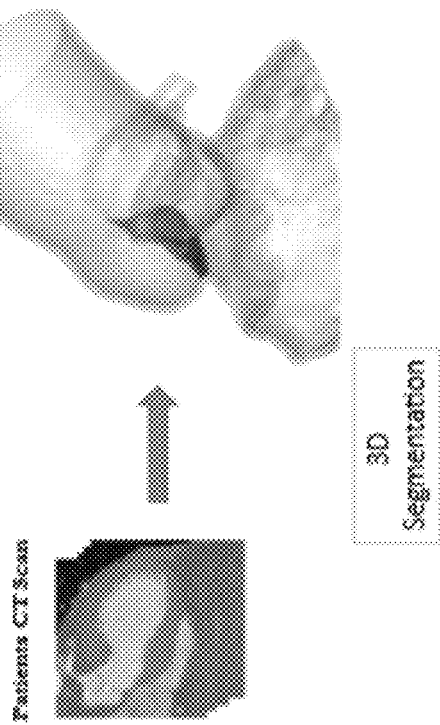
Figure 13C:
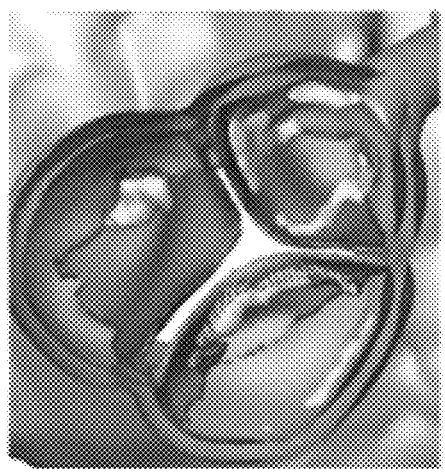
FIG. 13A-13C illustrate aortic valve leaflets and calcification tie-constraint nodes performed via the aortic root model assembly.
Figure 13B:
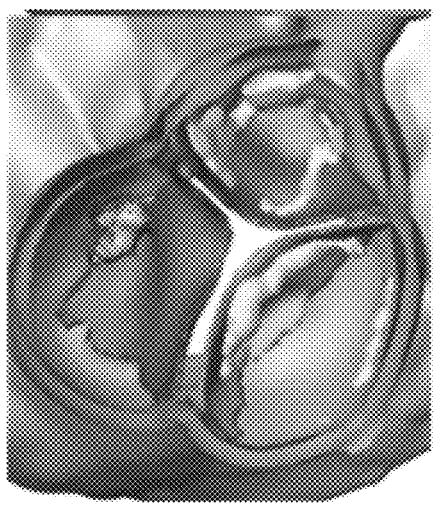
Figure 13A:
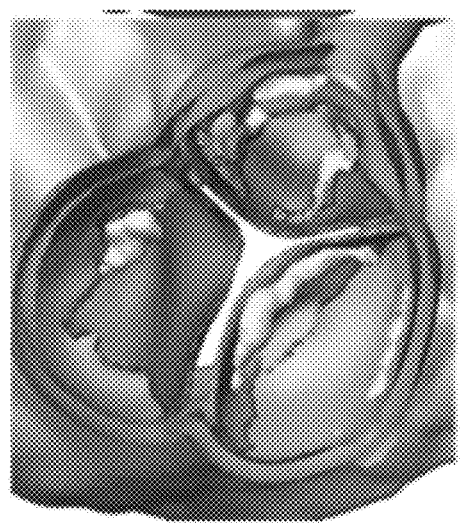
Figure 14B:
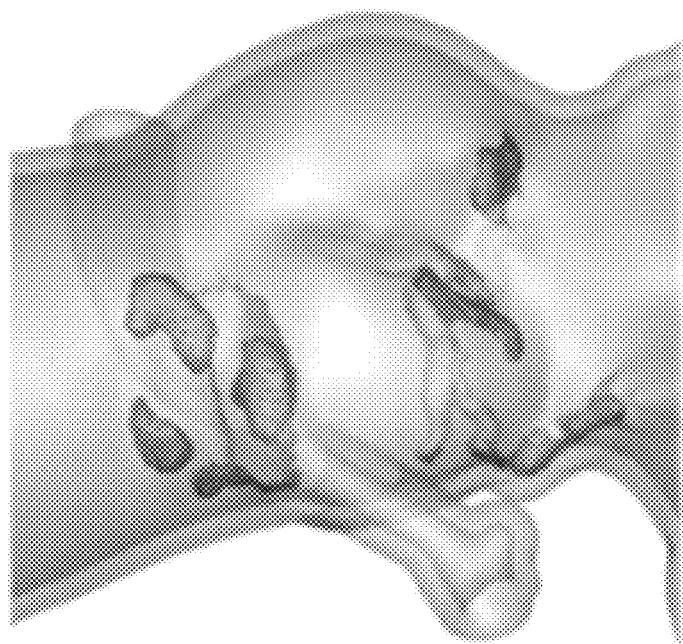
FIGS. 14A-14B illustrates aortic root and calcification tie-constraint nodes performed via the aortic root model assembly.
Figure 14A:
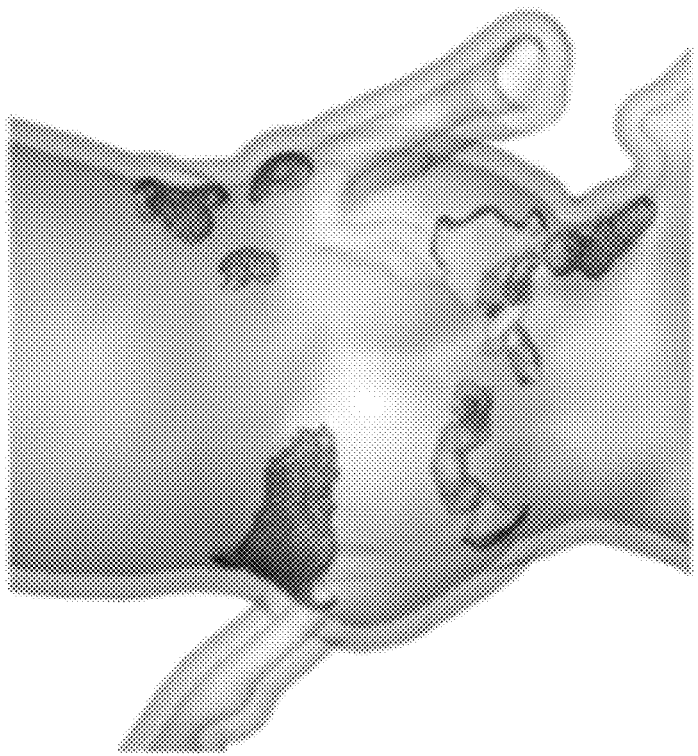
Figure 15C:
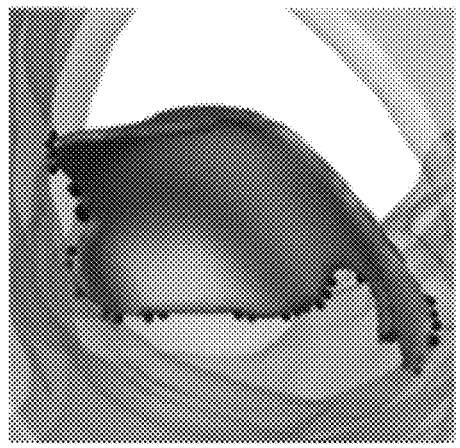
FIG. 15A-15C illustrates aortic valve leaflets and aortic root tie-constraint nodes performed via the aortic root model assembly.
Figure 15B:
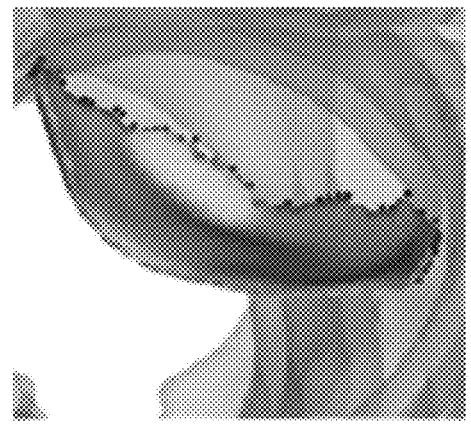
Figure 15A:
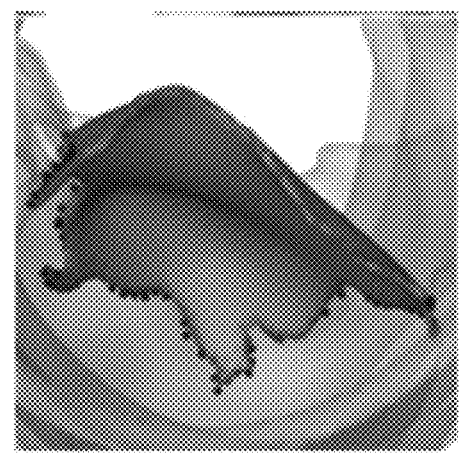

With reference to the flow diagram depicted in FIG. 12, baseline anatomy is visualized using standard care imaging techniques. By visualization during the entire duration of the cardiac cycle, defects under fully pressurized conditions (as opposed to deflated) are able to be visualized. This also allows surgeons to gain a better and more complete understanding of the geometric relationships of the aortic valve anatomy. This includes but is not limited to commissural heights, aspect ratios, full extent of the aortic pathology, and the relationship of the aortic valve to the ascending aorta.

3D Segmentation & Aortic Root Model Pre-Processing

After receiving the 3D imaging 28 at the server 10, the first step in the generative computational modeling framework is the pre-processing of the aortic root model. An operator first utilizes functions of the pre-processing module 82 on the server 10 via the user device 12 for surface processing to remove surface spikes from small imaging artifacts globally, performing local surface smoothing where necessary, assigning thickness to the aortic root wall and aortic valve leaflets, and trimming the structures outside the region of interest. The aortic valve leaflets are then trimmed and separated into individual parts, left, right, and non. Finally, in the Meshing step, all parts are meshed using a uniform meshing algorithm with an optimized mesh size.

Repair Option Generator—Aortic Root Model (ARM) Assembly

As a requirement of the generative artificial intelligence solver 84, the ARM must be assembled into one geometry from the individual parts of the aortic valve (e.g., Root, Calcification, Left Coronary Cusp, Right Coronary Cusp, and Non-Coronary Cusp). In certain aspects, the ARM part files outputted by the pre-processing module 82 are in STL format. To make them compatible with the generative artificial intelligence solver 84, the files are converted from STL to DAT format where the node coordinates and the triangle element connectivity information are written in text format. Once this is accomplished, the computational generative artificial intelligence solver 84 package assembles the pre-deployment ARM by introducing tie constraints that attach the parts to each other.

The tie constraints that attach the parts to each other are illustrated in FIGS. 13A-13C, 14A-14B, and 15A-15C. Here, each part (e.g., aortic root 86, calcification 88, and aortic valve leaflets 90) is shown along with the respective nodes identified by the generative artificial intelligence solver 84 for tie constraint nodes as highlighted by a series of outlining dots illustrated in FIGS. 13A-13C, 14A-14B, and 15A-15C. This concludes the ARM model assembly step generated by the pre-processing module 82.

Repair Option Generator—Generative Computational Model Solver

Figure 16:
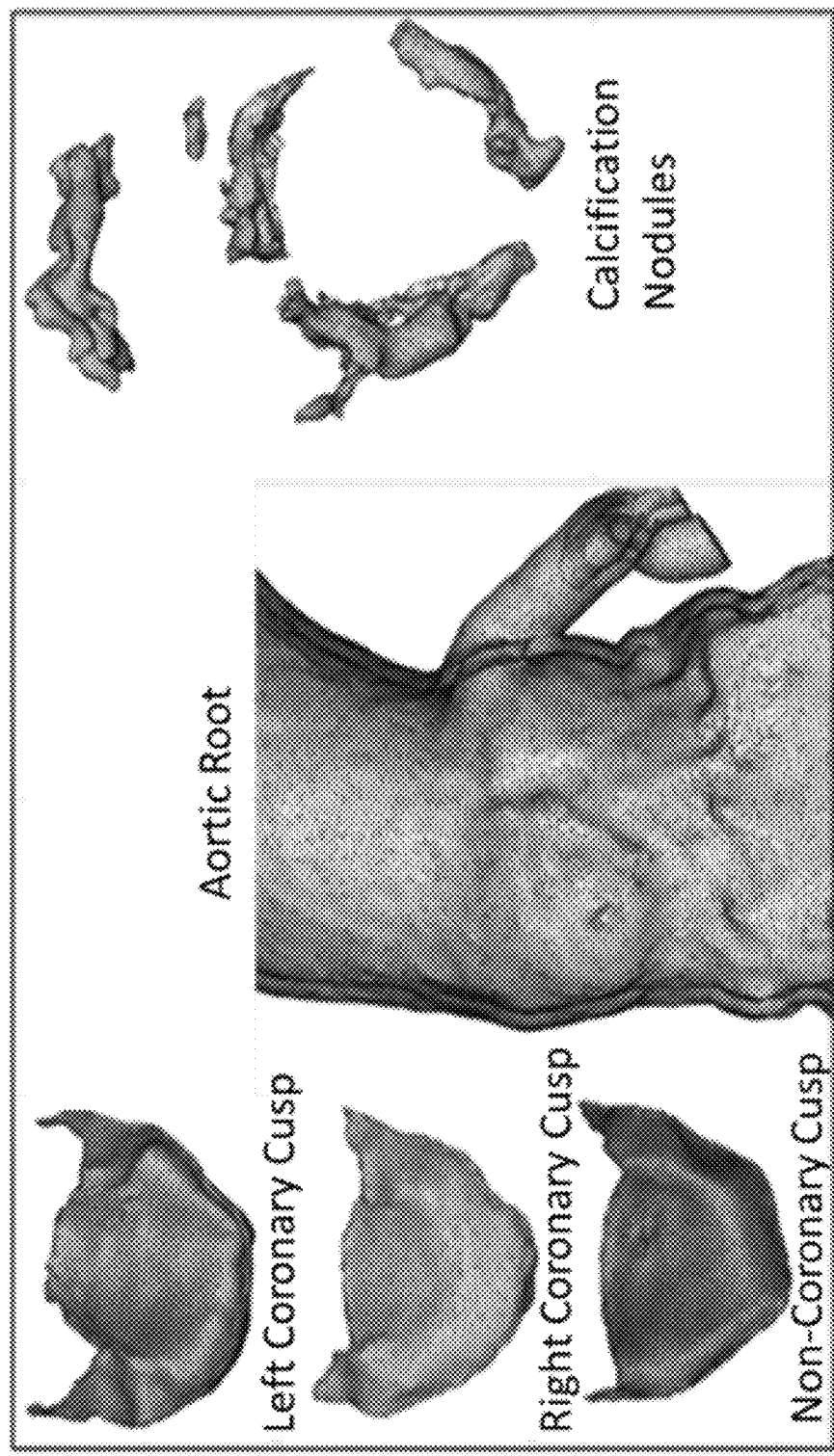
FIG. 16 illustrates individual STL files for the aortic valve leaflets, aortic root with coronaries, calcic lesions, and trans-catheter valve stent, skirt, and leaflet components.

In certain aspects, the computational modeling framework used in the present disclosure is a generative physics-based artificial intelligence model, such as the generative artificial intelligence solver 84. A meshless framework is adopted from the digital twin image of the patient's anatomy. The framework treats each node of each STL file (see FIG. 16) to behave as a point mass with its trajectory calculated based on the total force acting on the point mass as shown in the equations below:

$$1\ \vec{x}_i(t) = \vec{x}_i(0) + \int_0^t \vec{u}_i dt$$

$$2\ \vec{u}_i(t) = \vec{u}_i(0) + \int_0^t \vec{a}_i dt$$

$$3\ \vec{a}_i(t) = \frac{1}{m_i}\sum F$$

$\vec{x}_i(t)$ = position of each node $\vec{u}_i(t)$ = velocity of each node $\vec{a}_i(t)$ = acceleration of each node;

computed from the sum of all the forces acting on the given node.

Each node is under the influence of a set of neighboring nodes through ties. The set of neighboring nodes are defined by drawing a sphere of a given diameter and identifying all the nodes that fall within this sphere for the given node. This sphere is referred to as a Kernel. The kernel diameter is always set as the width (thickness) of the object (i.e. leaflet thickness, root wall thickness, stent thickness etc). The list of nodes that fall within each Kernel corresponding to each node are pre-computed as part of assembly step and stored as a text file. This list, which dictates the node pairings does not change as the parts deform throughout the simulation. Nodes which are tied (either to the neighboring nodes and/or to another part) experience tie forces. These forces not only dictate the trajectory of each node but also model the integrity and deformation of each part throughout the simulation.

The force on each point mass is the sum total of forces that all neighboring point masses within a specified kernel diameter, exert on the given point mass. Therefore, each point mass (node) is under the influence of neighboring point masses. These forces work as spring forces attempting to restore all the point masses within the kernel to their resting configuration. The triangular connectivity of the STL file itself plays no role in the evolution of the structures as the method is meshless. The connectivity helps output the corresponding deformed structures at any step through the evolution process.

In addition to forces from neighboring point masses within the kernel, a given node can experience contact force when a point mass (e.g. from another object) not belonging within its pre-defined kernel is within a specified contact distance that qualifies as "contact". When a contact happens there is an equal and opposite force acting on both nodes that are in contact with the two points sharing the same velocity averaged between their pre-contact velocities (fully inelastic collision contact). Furthermore, nodes may be marked as tied to nodes of another part (for example nodes at the leaflet insertion region into the aorta will be designated as tied to the aorta nodes). When a node is tied to an external node, it experiences an additional penalty restoring force that always attempts to preserve the original resting distance between the tied nodes.

Each mass also experiences a viscous and frictional damping force based on its velocity and the extent of deformation of the local structure at a specified length scale. The damping coefficient for each node dynamically adjusts to critical damping (based on instantaneous velocity and acceleration) and suppresses any numerical instability or oscillation in the whole system regardless of forces, displacements, or velocities.

Procedures, such as plication, can be simulated via the surgical simulator 106 by selecting (by the physician via the user interface of the user device 12) two sets of nodes and the generative computational model 108 introduces the loads iteratively to bring the two sets of nodes together. This algorithm is executed in parallel with the rest of the algorithm that maintains the natural state of all the components and structures in the assembly. For example, the plication algorithm can be used to re-suspend the aortic valve in a artificial aortic root. Here, the surgeon can select nodes on the corresponding structures that need to come together and the algorithm introduces loads that are iteratively adjusted to bring the structures together. The loading adjustments may be trained on a ground truth dataset including imaging (e.g., 3D imaging 28) or 3D information on how valve structures behave before and after plication or resuspension or any similar intervention/manipulation.

Several free manipulations of the anatomy are allowed by the generative simulator (e.g., the surgical simulator 106). For example, the surgeon can select nodes and move the nodes in 3D space. The algorithm will then introduce loads on the nodes that are then passed to the generative artificial intelligence solver 84 to generate the movements of all the nodes in the assembly in response to the free interactive movements from the surgeons hands. In certain aspects, the user interface on the user device 12 includes a haptic device to provide feedback to the surgeon on the forces/loads that have been introduced.

While the above descriptions captures the "physics" portion of the generator (e.g., the surgical simulator 106), the model (e.g., the generative computational model 108) can be tuned and/or trained on a ground truth dataset where there is pre- and post-generator ground truth data. The parameters and weights controlling the physics for each portion or part of the assembly and each component can be tuned through an iterative learning process including back propagation to adjust the parameter/weights. Furthermore, in certain aspects, alternative to the equations above, the predicted next position of each node can also be estimated with appropriate AI transformer models that have been trained on a database of full order or reduced order simulations or medical imaging data that consist of position-time information of how the structures move and deform under the action of device contact forces, blood pressure, or other such external loads.

Repair Option Generator—Geometric Analysis

Figure 17:
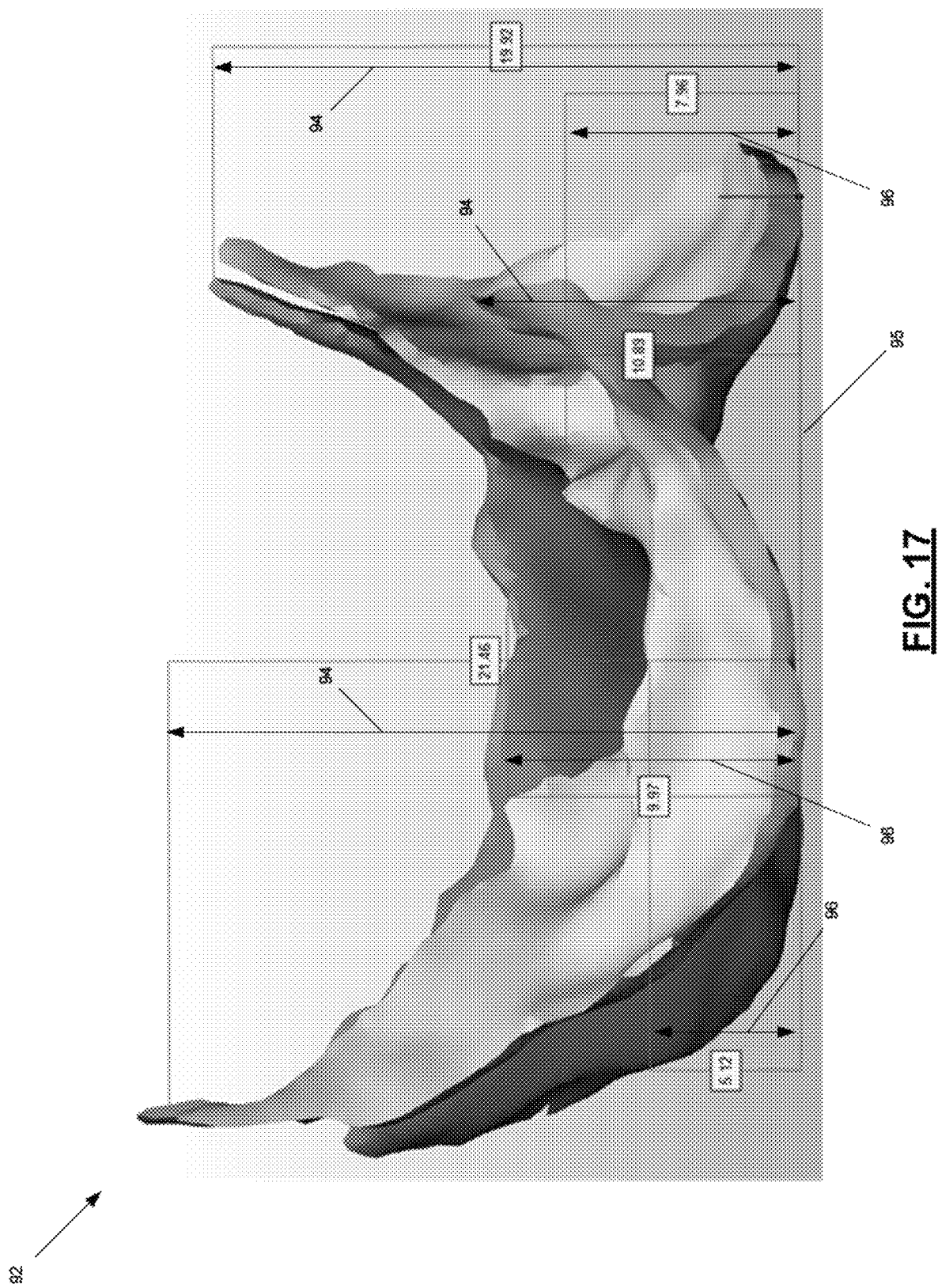
FIG. 17 illustrates geometric analysis on a digital twin of commissural and effective heights of the aortic valve.

As illustrated in FIG. 17, a digital twin anatomy 92 of the patient specific anatomy is generated such that geometric analysis of the commissural heights 94 and effective heights 96 can be determined. The commissural heights 94 are defined as the height of the commissures taken from the annulus plane 95. The effective heights 96 are defined as the axial distance from the annulus plane 95 to the leaflet tip at the halfway point of the free edge of the leaflet. For example, the commissural heights 94 depicted in FIG. 17 are 21.46 mm, 19.92 mm, and 10.89 mm, and the effective heights 96 depicted in FIG. 17 are 5.12 mm, 9.97 mm, and 7.96 mm.

Figure 18A:
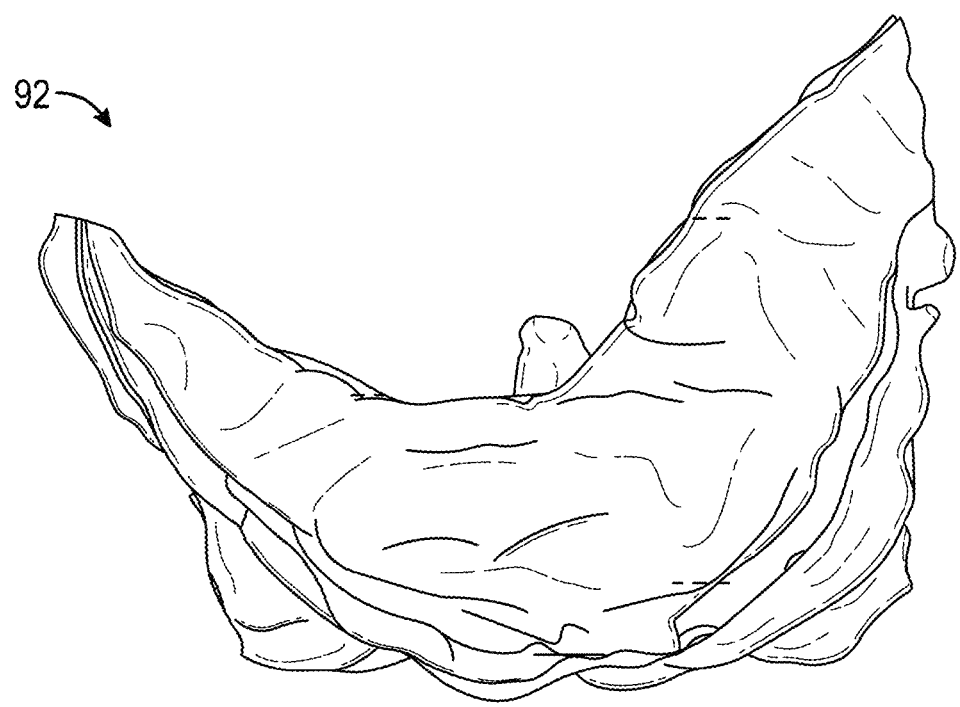
FIG. 18A illustrates geometric analysis on the digital twin of coaptation height of the aortic valve.
Figure 18B:
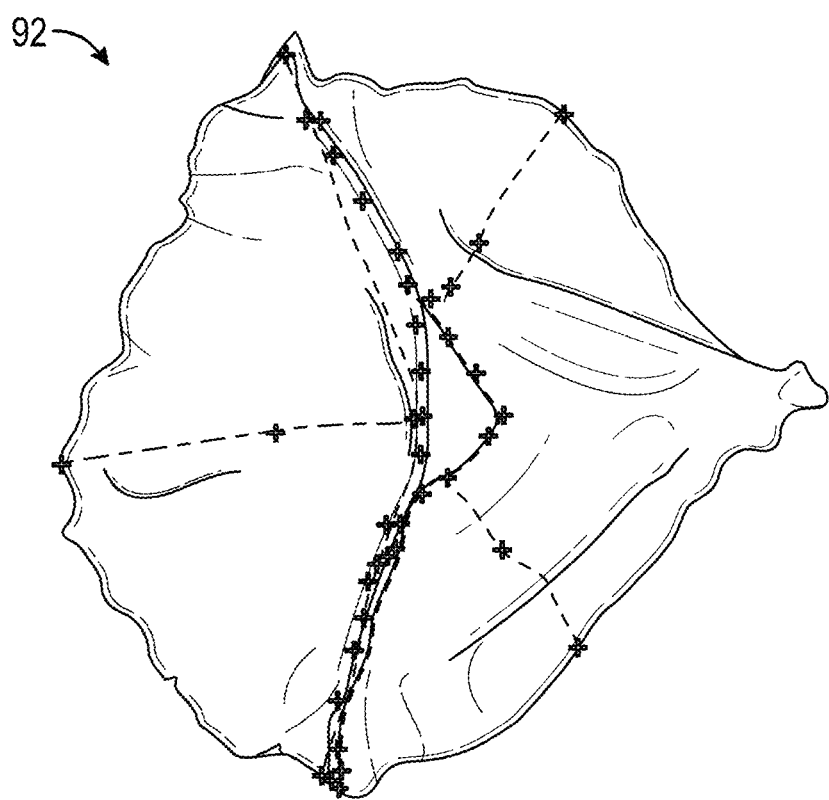
FIG. 18B illustrates geometric analysis on the digital twin of geometric height, free margin length, and commissure orientation of the aortic valve.

Additionally, with reference to FIGS. 18A and 18B, in depth and quantitative analysis of leaflet coaptation heights, geometric heights, free margin length, and commissural orientation can be conducted automatically via the digital twin anatomy 92 of FIG. 17.

Repair Option Generator—Surgical Simulator

Figure 19A:
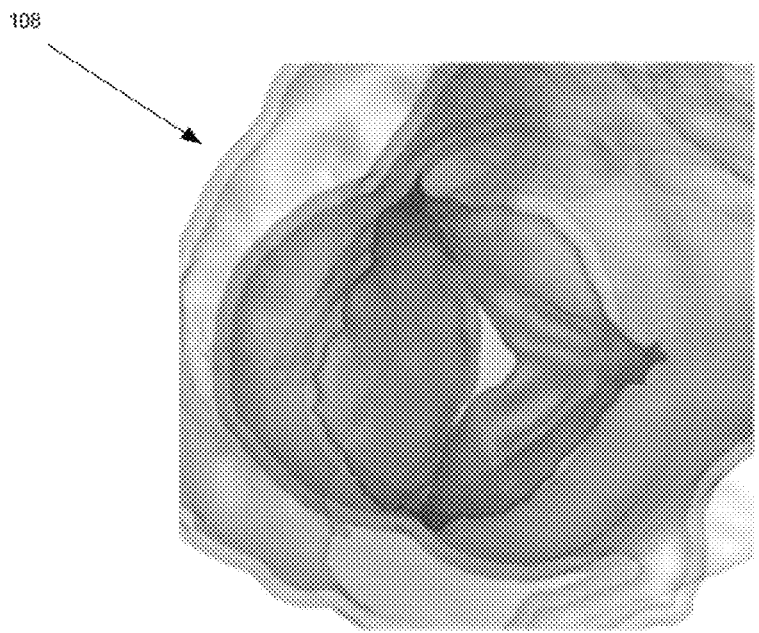
FIG. 19A illustrates a generative computational model of the 3D digital twin of a baseline aortic valve.
Figure 19B:
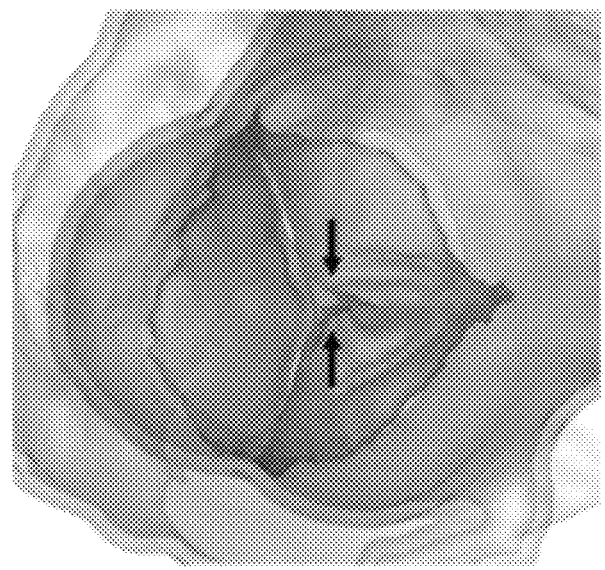
FIG. 19B illustrates the generative computational model of the 3D digital twin of the baseline aortic valve simulating plication.
Figure 19C:
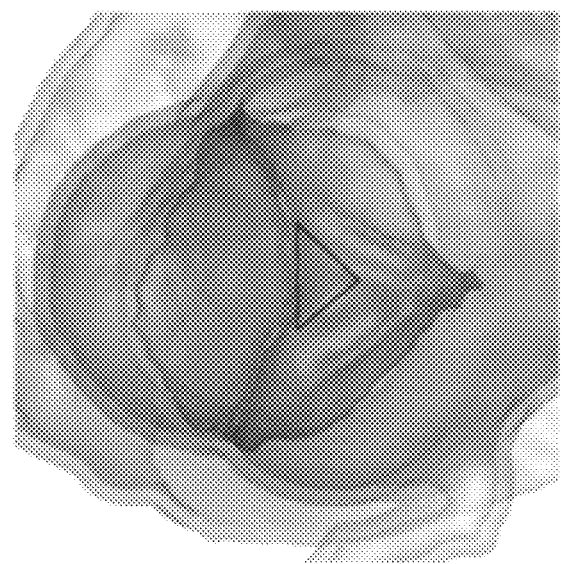
FIG. 19C illustrates the generative computational model of the 3D digital twin of the baseline aortic valve simulating leaflet grafting.
Figure 19D:
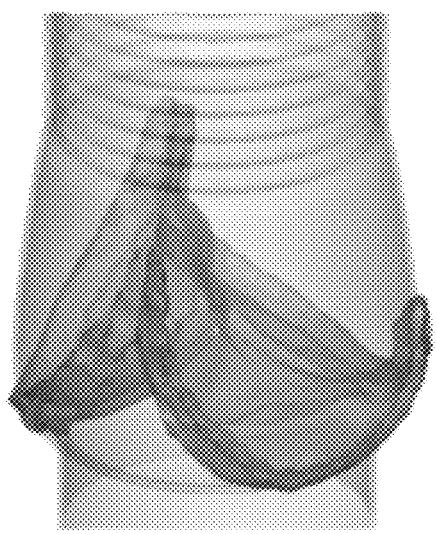
FIG. 19D illustrates the generative computational model of the 3D digital twin of the baseline aortic valve simulating aortic root grafting.

The patient specific 3D digital twin anatomy 92 can then be fed into a surgical simulator 106 which uses the physics driven artificial intelligence algorithm (described above) to create a generative computational model 108 (see FIG. 19A). The surgeon can select surgical techniques to apply to specific portions of the patient's anatomy. For example, the surgeon could decide to plicate (see FIG. 19B) or graft a leaflet (see FIG. 19C), as well as use a Dacron™ graft to fix an aortic root pathology (see FIG. 19D).

Performance Predictor

Figure 20:
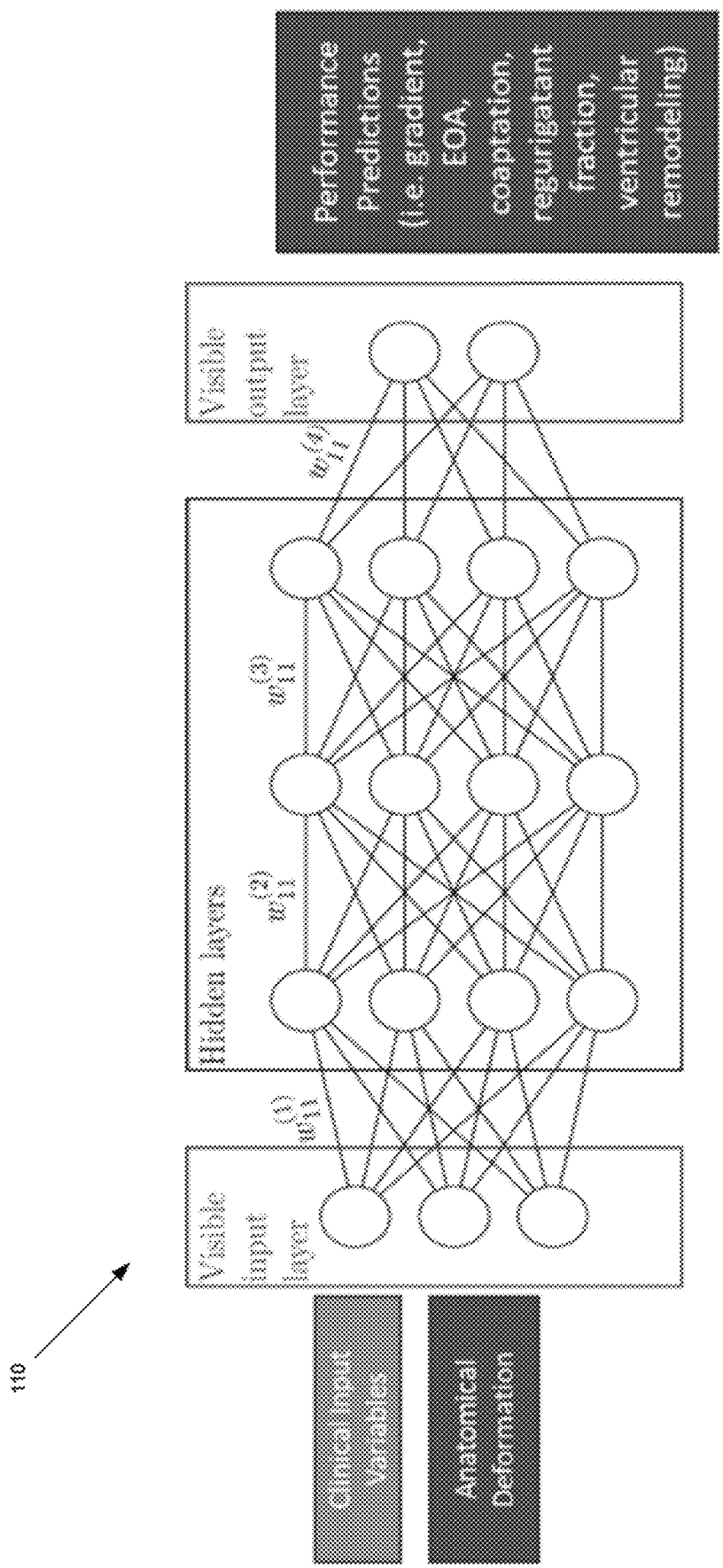
FIG. 20 illustrates a schematic of a performance predictor machine learning module, according to certain aspects of the present disclosure.

With reference to FIG. 20, each scenario selected by the physician will take anatomical deformation data (which is output by the generative computational model 108) and use it as input data into a machine learning module 110 that will be able to predict post-procedural performance of the aortic valve by outputting relevant clinical information such as the prediction of post-operative valve gradient, effective orifice area, leaflet coaptation, regurgitant fraction, and ventricular modeling. The second input that will be fed into the machine learning module 110 will be relevant clinical variables that can be used to predict post-repair performance of the aortic valve.

Figure 21:
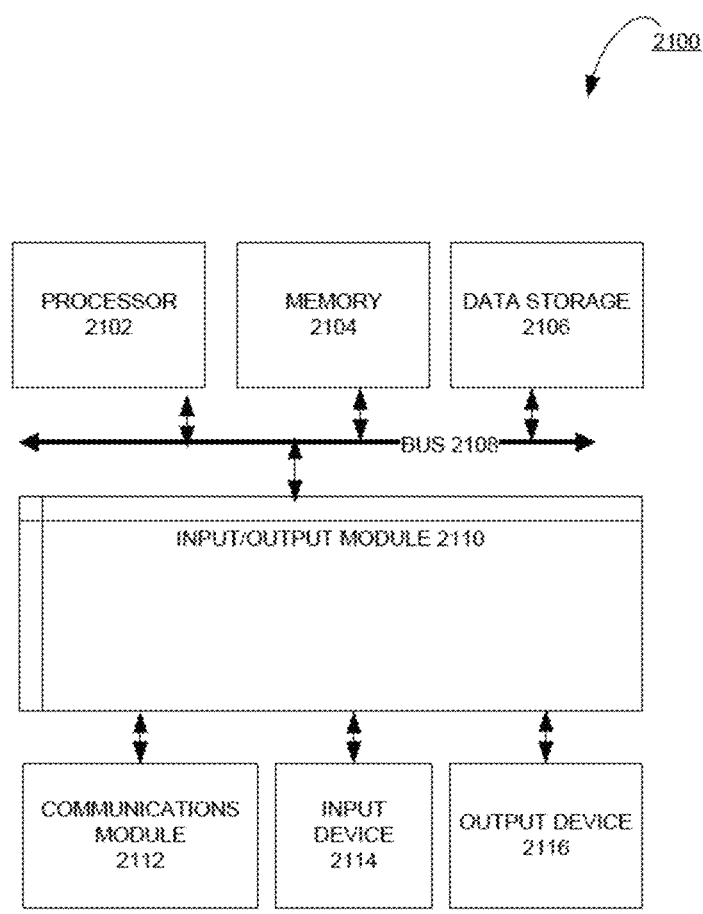
FIG. 21 is a block diagram illustrating an example computer system with which the server and user device of FIG. 1 can be implemented.

FIG. 21 is a block diagram illustrating an example computer system 2100 with which the server 10 and the user device 12 of FIG. 1 can be implemented. In certain aspects, the computer system 2100 may be implemented using hardware or a combination of software and hardware, either in a dedicated server, or integrated into another entity, or distributed across multiple entities.

Computer system 2100 (e.g., the server 10 and the user device 12) includes a bus 2108 or other communication mechanism for communicating information, and a processor 2102 (e.g., the processor 20, 24) coupled with bus 1508 for processing information. According to one aspect, the computer system 2100 can be a cloud computing server of an IaaS that is able to support PaaS and SaaS services.

Computer system 2100 can include, in addition to hardware, code that creates an execution environment for the computer program in question, e.g., code that constitutes processor firmware, a protocol stack, a database management system, an operating system, or a combination of one or more of them stored in an included memory 2104 (e.g., the memory 22, 26), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 2108 for storing information and instructions to be executed by processor 2102. The processor 2102 and the memory 2104 can be supplemented by, or incorporated in, special purpose logic circuitry.

The instructions may be stored in the memory 2104 and implemented in one or more computer program products, e.g., one or more modules of computer program instructions encoded on a computer readable medium for execution by, or to control the operation of, the computer system 2100.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 2100 further includes a data storage device 2106 such as a magnetic disk or optical disk, coupled to bus 1508 for storing information and instructions. Computer system 2100 may be coupled via input/output module 2110 to various devices. The input/output module 2110 can be any input/output module. Example input/output modules 2110 include data ports such as USB ports. In addition, input/output module 2110 may be provided in communication with processor 2102, so as to enable near area communication of computer system 2100 with other devices. The input/output module 2110 may provide, for example, for wired communication in some implementations, or for wireless communication in other implementations, and multiple interfaces may also be used. The input/output module 2110 is configured to connect to a communications module 2112. Example communications modules 2112 (e.g., the communications module 16, 18) include networking interface cards, such as Ethernet cards and modems.

In certain aspects, the input/output module 2110 is configured to connect to a plurality of devices, such as an input device 2114 and/or an output device 2116. Example input devices 2114 include a keyboard and a pointing device, e.g., a mouse or a trackball, by which a user can provide input to the computer system 2100. Other kinds of input devices 2114 can be used to provide for interaction with a user as well, such as a tactile input device, visual input device, audio input device, or brain-computer interface device.

According to one aspect of the present disclosure the server 10 and the user device 12 can be implemented using a computer system 2100 in response to processor 2102 executing one or more sequences of one or more instructions contained in memory 2104. Such instructions may be read into memory 2104 from another machine-readable medium, such as data storage device 2106. Execution of the sequences of instructions contained in main memory 2104 causes processor 2102 to perform the process steps described herein. One or more processors in a multi-processing arrangement may also be employed to execute the sequences of instructions contained in memory 2104. Processor 2102 may process the executable instructions and/or data structures by remotely accessing the computer program product, for example by downloading the executable instructions and/or data structures from a remote server through communications module 2112 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Figure 22:
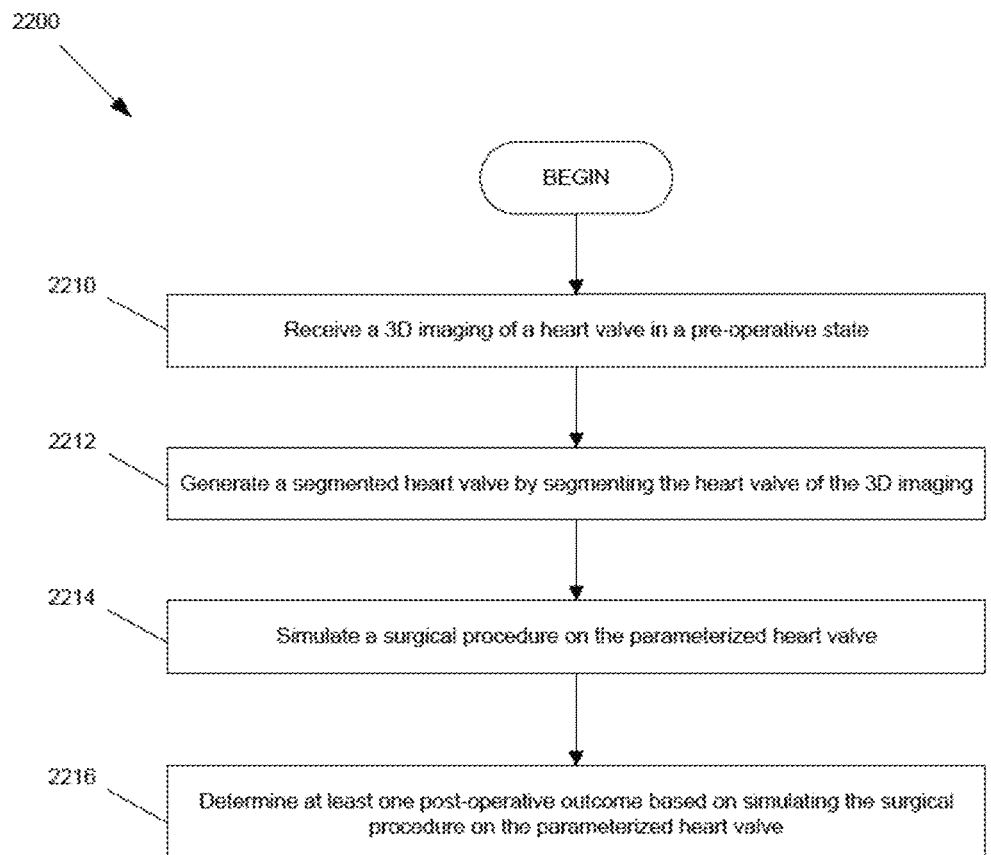
FIG. 22 illustrates an example process for pre-operatively planning medical surgical repair.

FIG. 22 illustrates an example process 2200 for pre-operatively planning medical surgical repair.

The process begins by proceeding to step 2210 when the processor 20 of the server 10 receives a 3D imaging. As depicted at step 2212, the processor 20 of the server 10 generates a segmented heart valve by segmenting the heart valve of the 3D imaging. The processor 20 of the server 10 simulates a surgical procedure on the parameterized heart valve, as depicted at step 2214. The processor 20 of the server 10 determines at least one post-operative outcome based on simulating the surgical procedure on the parameterized heart valve, as depicted at step 2216.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
receiving a 3D imaging of a heart valve in a pre-operative state;
generating a segmented heart valve by segmenting the heart valve of the 3D imaging;
generating, subsequent to generating the segmented heart valve, a simplified parameterized heart valve by parameterizing the segmented heart valve, wherein parameterizing the segmented heart valve comprises
selecting key points of the segmented heart valve,
scaling the segmented heart valve by commissural dimension,
generating an anterior mitral valve triangle and a posterior mitral valve triangle based on selecting the key points and scaling the segmented heart valve by the commissural dimension,
scaling the posterior mitral valve triangle,
rotating the anterior mitral valve triangle,
scaling, after rotation, the anterior mitral valve triangle, and
generating the simplified parameterized heart valve based on the posterior mitral valve triangle post-scaling and the anterior mitral valve triangle post-rotating and post-scaling;
simulating interactively, responsive to interactive user-controlled input via a user device, a surgical procedure on the simplified parameterized heart valve, wherein the interactive user-controlled input comprises one of deployment of a device associated with the surgical procedure and interactive manipulation of anatomy of the simplified parameterized heart valve, wherein the user device comprises a haptic device configured to provide feedback responsive to the interactive user-controlled input of deploying the device associated with the surgical procedure with respect to the anatomy of the simplified parameterized heart valve to determine a prediction of at least one post-operative outcome; and
determining the prediction of the at least one post-operative outcome based on simulating interactively the surgical procedure on the simplified parameterized heart valve.

2. The computer-implemented method of claim 1, wherein generating the simplified parameterized heart valve comprises:
collapsing the simplified parameterized heart valve for assessing leaflet curvature.

3. The computer-implemented method of claim 1, wherein segmenting the heart valve of the 3D imaging comprises:
segmenting mitral valve leaflets during diastole and systole.

4. The computer-implemented method of claim 1, wherein the key points comprise an anterior annulus point, a posterior annulus point, commissural points, A2 point, P2 point, and a leaflet tip.

5. The computer-implemented method of claim 1, wherein the surgical procedure is one of mitral valve clip placement, plication, and resuspension of the heart valve.

6. The computer-implemented method of claim 1, wherein simulating interactively the surgical procedure on the simplified parameterized heart valve comprises interactive simulation via a generative computational model trained on a ground truth dataset.

7. A system comprising:
a user device comprising a haptic device;
a memory comprising instructions; and
a processor configured to execute the instructions which, when executed, cause the processor to:
receive a 3D imaging of a heart valve in a pre-operative state;
generate a segmented heart valve by segmenting the heart valve of the 3D imaging;
generate, subsequent to generating the segmented heart valve, a simplified parameterized heart valve by parameterizing the segmented heart valve, wherein parameterizing the segmented heart valve comprises
selecting key points of the segmented heart valve,
scaling the segmented heart valve by commissural dimension,
generating an anterior mitral valve triangle and a posterior mitral valve triangle based on selecting the key points and scaling the segmented heart valve by the commissural dimension,
scaling the posterior mitral valve triangle,
rotating the anterior mitral valve triangle,
scaling, after rotation, the anterior mitral valve triangle, and
generating the simplified parameterized heart valve based on the posterior mitral valve triangle post-scaling and the anterior mitral valve triangle post-rotating and post-scaling;
simulate interactively, responsive to interactive user-controlled input via the user device, a surgical procedure on the simplified parameterized heart valve, wherein the interactive user-controlled input comprises one of deployment of a device associated with the surgical procedure and interactive manipulation of anatomy of the simplified parameterized heart valve, wherein the haptic device is configured to provide feedback responsive to the interactive user-controlled input of deploying the device associated with the surgical procedure with respect to the anatomy of the simplified parameterized heart valve to determine a prediction of at least one post-operative outcome; and
determine the prediction of the at least one post-operative outcome based on simulating interactively the surgical procedure on the simplified parameterized heart valve.

8. The system of claim 7, further comprising instructions to cause the processor to:
collapse the simplified parameterized heart valve for assessing leaflet curvature.

9. The system of claim 7, further comprising instructions to cause the processor to:
segment mitral valve leaflets during diastole and systole.

10. The system of claim 7, wherein the surgical procedure is one of mitral valve clip placement, plication, and resuspension of the heart valve.

11. The system of claim 7, wherein the instructions to cause the processor to simulate interactively the surgical procedure on the simplified parameterized heart valve comprises instructions to simulate interactively via a generative computational model trained on a ground truth dataset.

12. A non-transitory machine-readable storage medium comprising machine-readable instructions for causing a processor in communication with a user device comprising a haptic device to execute a method, the method comprising:
receiving a 3D imaging of a heart valve in a pre-operative state;
generating a segmented heart valve by segmenting the heart valve of the 3D imaging;
generating, subsequent to generating the segmented heart valve, a simplified parameterized heart valve by parameterizing the segmented heart valve, wherein parameterizing the segmented heart valve comprises
selecting key points of the segmented heart valve,
scaling the segmented heart valve by commissural dimension,
generating an anterior mitral valve triangle and a posterior mitral valve triangle based on selecting the key points and scaling the segmented heart valve by the commissural dimension,
scaling the posterior mitral valve triangle,
rotating the anterior mitral valve triangle,
scaling, after rotation, the anterior mitral valve triangle, and
generating the simplified parameterized heart valve based on the posterior mitral valve triangle post-scaling and the anterior mitral valve triangle post-rotating and post-scaling;
simulating interactively, responsive to interactive user-controlled input via the user device, a surgical procedure on the simplified parameterized heart valve, wherein the interactive user-controlled input comprises one of deployment of a device associated with the surgical procedure and interactive manipulation of anatomy of the simplified parameterized heart valve, wherein the machine-readable instructions further cause the haptic device to provide feedback responsive to the interactive user-controlled input of deploying the device associated with the surgical procedure with respect to the anatomy of the simplified parameterized heart valve to determine a prediction of at least one post-operative outcome; and
determining the prediction of the at least one post-operative outcome based on simulating interactively the surgical procedure on the simplified parameterized heart valve.

13. The non-transitory machine-readable storage medium of claim 12, wherein the surgical procedure is one of mitral valve clip placement, plication, and resuspension of the heart valve.

14. The non-transitory machine-readable storage medium of claim 12, wherein simulating interactively the surgical procedure on the simplified parameterized heart valve comprises interactive simulation via a generative computational model trained on a ground truth dataset.

* * * * *